(12) United States Patent  
Takeguchi et al.

(10) Patent No.: US 8,977,130 B2  
(45) Date of Patent: Mar. 10, 2015

(54) OPTICAL TRANSMISSION DEVICE AND OPTICAL FILTER CIRCUIT

(75) Inventors: Koji Takeguchi, Kawasaki (JP); Kazuo Takatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/325,780

(22) Filed: Dec. 14, 2011

(65) Prior Publication Data

US 2012/0207477 A1    Aug. 16, 2012

(30) Foreign Application Priority Data

Feb. 14, 2011   (JP) ................................ 2011-029213

(51) Int. Cl.  
*H04J 14/02* (2006.01)

(52) U.S. Cl.  
CPC ......... *H04J 14/0204* (2013.01); *H04J 14/0205* (2013.01); *H04J 14/021* (2013.01); *H04J 14/0212* (2013.01); *H04J 14/0221* (2013.01); *H04J 14/0209* (2013.01)  
USPC ................... 398/85; 398/79; 398/50; 398/48; 385/24

(58) Field of Classification Search  
None  
See application file for complete search history.

(56) References Cited

U.S. PATENT DOCUMENTS

| | | | |
|---|---|---|---|
| 7,499,652 B2 * | 3/2009 | Zhong et al. ................... | 398/83 |
| 2002/0025109 A1 | 2/2002 | Shirasaki | |
| 2004/0190903 A1 | 9/2004 | Miura et al. | |
| 2005/0220397 A1 | 10/2005 | Oikawa et al. | |
| 2006/0062577 A1 | 3/2006 | Miura et al. | |
| 2006/0210266 A1 * | 9/2006 | Aoki ................................ | 398/19 |
| 2006/0210273 A1 | 9/2006 | Gumaste et al. | |
| 2009/0226173 A1 | 9/2009 | Yano et al. | |
| 2010/0129076 A1 * | 5/2010 | Barbarossa ..................... | 398/48 |

FOREIGN PATENT DOCUMENTS

| | | |
|---|---|---|
| EP | 1 703 762 A2 | 9/2006 |
| EP | 1 744 477 A1 | 1/2007 |
| JP | 2004-179836 | 6/2004 |
| JP | 2006-86920 | 3/2006 |
| JP | 2006-262479 | 9/2006 |

(Continued)

OTHER PUBLICATIONS

Wilson et al., "Spectrum Steering: A New Platform for Wavelength Filtering, Switching, and Monitoring", SPIE, PO Box 10 Bellingham WA 98227-0010 USA, 2005. (10 pages).

(Continued)

*Primary Examiner* — Ken Vanderpuye  
*Assistant Examiner* — Merlin Brito Peguero  
(74) *Attorney, Agent, or Firm* — Staas & Halsey LLP

(57) ABSTRACT

There is provided an optical transmission device, the optical transmission device including a wavelength selective switch configured to select a first optical signal having a first wavelength from an input signal of wavelength division multiplexing, an optical filter circuit configured to include an optical tunable filter having a pass wavelength that is tunable to a second wavelength of a second optical signal for passing therethrough, a splitter configured to split the input signal, a split signal split by the splitter being transferred to the optical filter circuit, and a coupler configured to couple the first optical signal selected by the wavelength selective switch and the second optical signal passed through the optical filter circuit.

17 Claims, 16 Drawing Sheets

(56) References Cited

FOREIGN PATENT DOCUMENTS

| | | |
|---|---|---|
| JP | 2009-210841 | 9/2009 |
| JP | 2010-074565 | 4/2010 |
| WO | 2005/096534 | 10/2005 |

OTHER PUBLICATIONS

Extended European Search Report dated May 3, 2013 in European Application No. 11195187.7-1851/2487820.

Japanese Notification of Reasons for Refusal dated Sep. 16, 2014 in Japanese Application No. 2011-029213.

* cited by examiner

US 8,977,130 B2

OPTICAL TRANSMISSION DEVICE AND OPTICAL FILTER CIRCUIT

CROSS-REFERENCE TO RELATED APPLICATION

This application is based upon and claims the benefit of priority of the prior Japanese Patent Application No. 2011-029213, filed on Feb. 14, 2011, the entire contents of which are incorporated herein by reference.

FIELD

The embodiments discussed herein are related to an optical transmission device and an optical filter circuit.

BACKGROUND

Optical transmission systems which transmit WDM (Wavelength Division Multiplexing) signals come into wide use in recent years. A WDM system transmits a plurality of optical signals by the use of different wavelengths.

An optical transmission system which transmits a WDM signal configured to narrow a wavelength interval (i.e., to make wavelength density of multiplexed waves higher) so as to achieve high throughput is proposed or developed. The ITU-T Recommendation, e.g., includes 100 GHz grid spacing and 50 GHz grid spacing. The 100 GHz grid spacing specifies arrangements of respective wavelengths of a WDM signal with respect to a reference wavelength at every 100 GHz space. Similarly, the 50 GHz grid spacing specifies arrangements of respective wavelengths of a WDM signal at every 50 GHz space. Thus, in order to build an optical transmission system conforming to the ITU-T Recommendation, optical signals are arranged by the use of the wavelengths specified by the Recommendation. That is, design of an optical communication system and an optical transmission device is limited by dependency on wavelength arrangements.

A CWDM (Coarse Wavelength Division Multiplexing) optical transmission system mentioned below is proposed as one of the related technologies. In the CWDM optical transmission system, an additional optical transmission unit of a DWDM (Dense Wavelength Division Multiplexing) system provides a multiplexer via a variable optical attenuator with a DWDM optical signal instead of at least one wavelength of a plurality of optical signals corresponding to a CWDM system. The DWDM optical signal is multiplexed with the optical signals corresponding to the CWDM system and is transmitted to a transmission line. Total power of the DWDM optical signal transmitted to the transmission line at this time is attenuated by the variable optical attenuator so as to be substantially same as power per wavelength of the CWDM optical signal. The optical signal propagated to an optical receiving station is demultiplexed by a demultiplexer, and the DWDM optical signal corresponding to the additional wavelength is amplified by an optical amplifier and then received by an additional optical receiving unit, e.g., as disclosed in International Publication Pamphlet No. WO2005/096534.

Further, another one of the related technologies is proposed, e.g., as disclosed in Japanese Laid-open Patent Publication No. 2006-086920, such that optical signals of different modulation rates are put to any wavelengths on a wavelength grid with regular spacing.

SUMMARY

According to an aspect of the embodiment, there is provided an optical transmission device, the optical transmission device including a wavelength selective switch configured to select a first optical signal having a first wavelength from an input signal of wavelength division multiplexing, an optical filter circuit configured to include an optical tunable filter having a pass wavelength that is tunable to a second wavelength of a second optical signal for passing therethrough, a splitter configured to split the input signal, a split signal split by the splitter being transferred to the optical filter circuit, and a coupler configured to couple the first optical signal selected by the wavelength selective switch and the second optical signal passed through the optical filter circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an exemplary WDM signal that the optical transmission device 1 is provided with;

DESCRIPTION OF EMBODIMENTS

An ordinary WDM transmission system multiplexes an optical signal by the use of a predetermined wavelength grid (e.g., a wavelength grid conforming to the ITU-T Recommendation) and transmits the multiplexed optical signal. In the future, though, a constitution for multiplexing optical signals by the use of wavelengths not having been standardized yet so as to expand a throughput of the WDM transmission system is conceivable. In such a case, it is necessary to install a new optical transmission device which corresponds to a newly specified wavelength grid. Otherwise, it is necessary to replace an existing optical transmission device with a new optical transmission device. That is, the entire optical communication system may cost a great deal. Thus, an optical transmission device which processes an optional or preferred wavelength is awaited. Further, as some wavelength selective switch is of a MEMS (Micro Electro Mechanical Systems) mirror of a low fill factor value, there is room for effective use of unused wavelength range.

Figure 1:
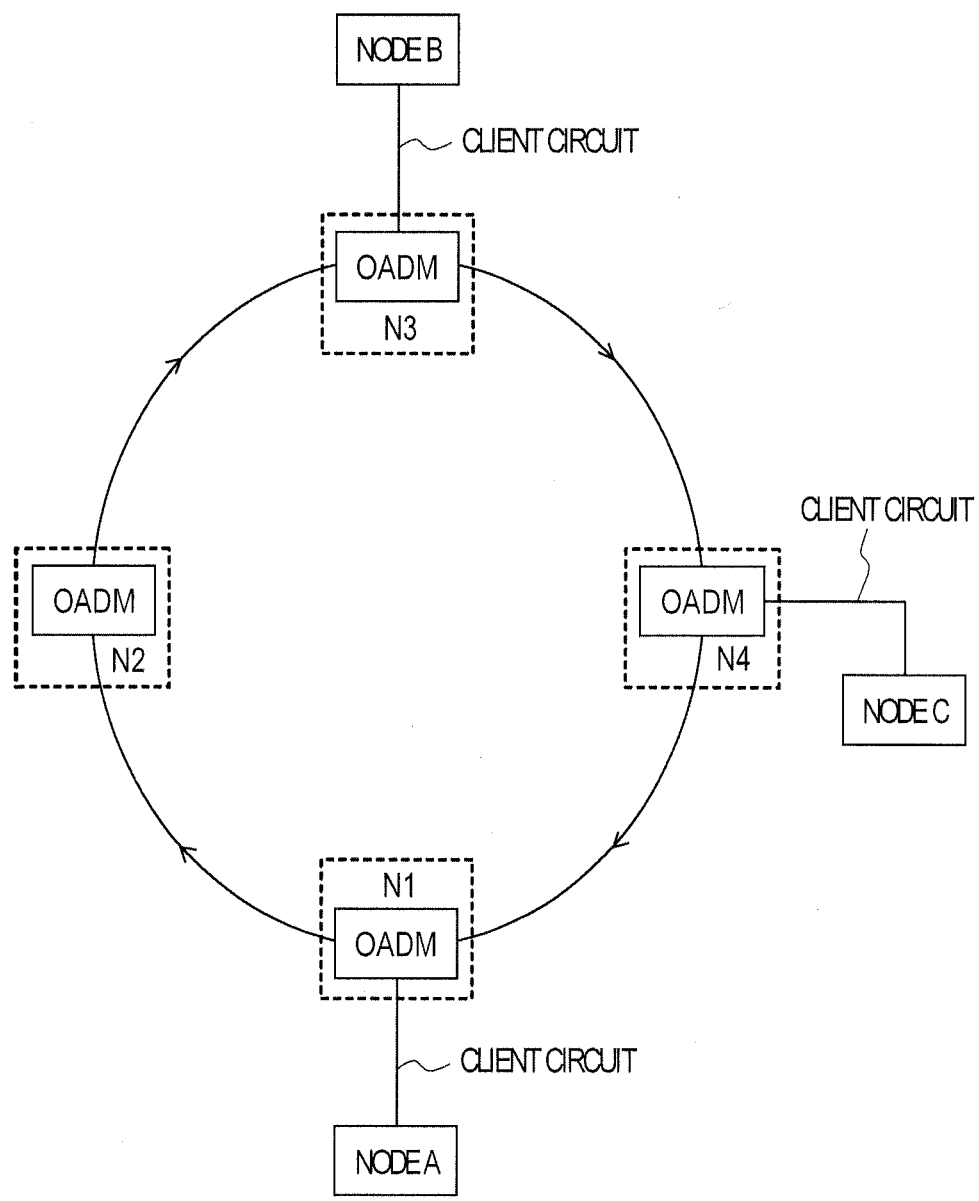
FIG. 1 illustrates an exemplary network system in which an optical transmission device of the embodiment is used.

FIG. 1 illustrates an exemplary network system in which an optical transmission device of the embodiment is used. The network system illustrated in FIG. 1 has optical nodes N1-N4. The optical nodes N1-N4 are connected in a ring through an optical fiber, and transmit an optical signal in the clockwise direction as exemplarily illustrated in FIG. 1.

Incidentally, the network system may be formed by a double ring. In this case, the network system has an optical fiber ring which transmits an optical signal in the clockwise direction, and an optical fiber ring which transmits an optical signal in the counterclockwise direction. Further, the network system may have a plurality of network rings. Otherwise, the network system may exclude a ring network.

The optical nodes each have an OADM (Optical Add/Drop Multiplexer). The OADM has a function to drop optical signals of one or a plurality of wavelengths from a WDM (Wavelength Division Multiplexing) signal, and a function to add optical signals of one or a plurality of wavelengths to a WDM signal.

In order, e.g., that a node A transmits data to a node B in the network system constituted as described above, the node A transmits an optical signal which carries the data, e.g., by the use of a wavelength $\lambda 1$. Otherwise, the node A transmits an optical signal by the use of an optional wavelength and a transponder of the optical node N1 may convert that wavelength to the wavelength $\lambda 1$. In both cases, the optical add/drop multiplexer of the optical node N1 adds the optical signal transmitted by the node A to a WDM signal going to the optical node N2. The optical node N2 transmits this WDM signal to the optical node N3. Then, the optical add/drop multiplexer of the optical node N3 drops the optical signal of the wavelength $\lambda 1$ from this WDM signal and transfers the dropped signal to the node B. The data transmitted by the node A is thereby received by the node B.

In order that a node C transmits data to the node A, the node C transmits an optical signal which carries the data, e.g., by the use of a wavelength $\lambda 2$. Then, the optical add/drop multiplexer of the optical node N4 adds the optical signal transmitted by the node C to a WDM signal going to the optical node N1. Then, the optical add/drop multiplexer of the optical node N1 extracts the optical signal of the wavelength $\lambda 2$ from this WDM signal and transfers the extracted signal to the node A. The data transmitted by the node C is thereby received by the node A.

The optical transmission device of the embodiment is applied to the optical add/drop multiplexer that the respective optical nodes are each provided with as exemplarily illustrated in FIG. 1. The optical transmission device of the present invention is not limited to an optical add/drop multiplexer, though, and may be applied to a communication device which transmits a WDM signal.

First Embodiment

Figure 2:
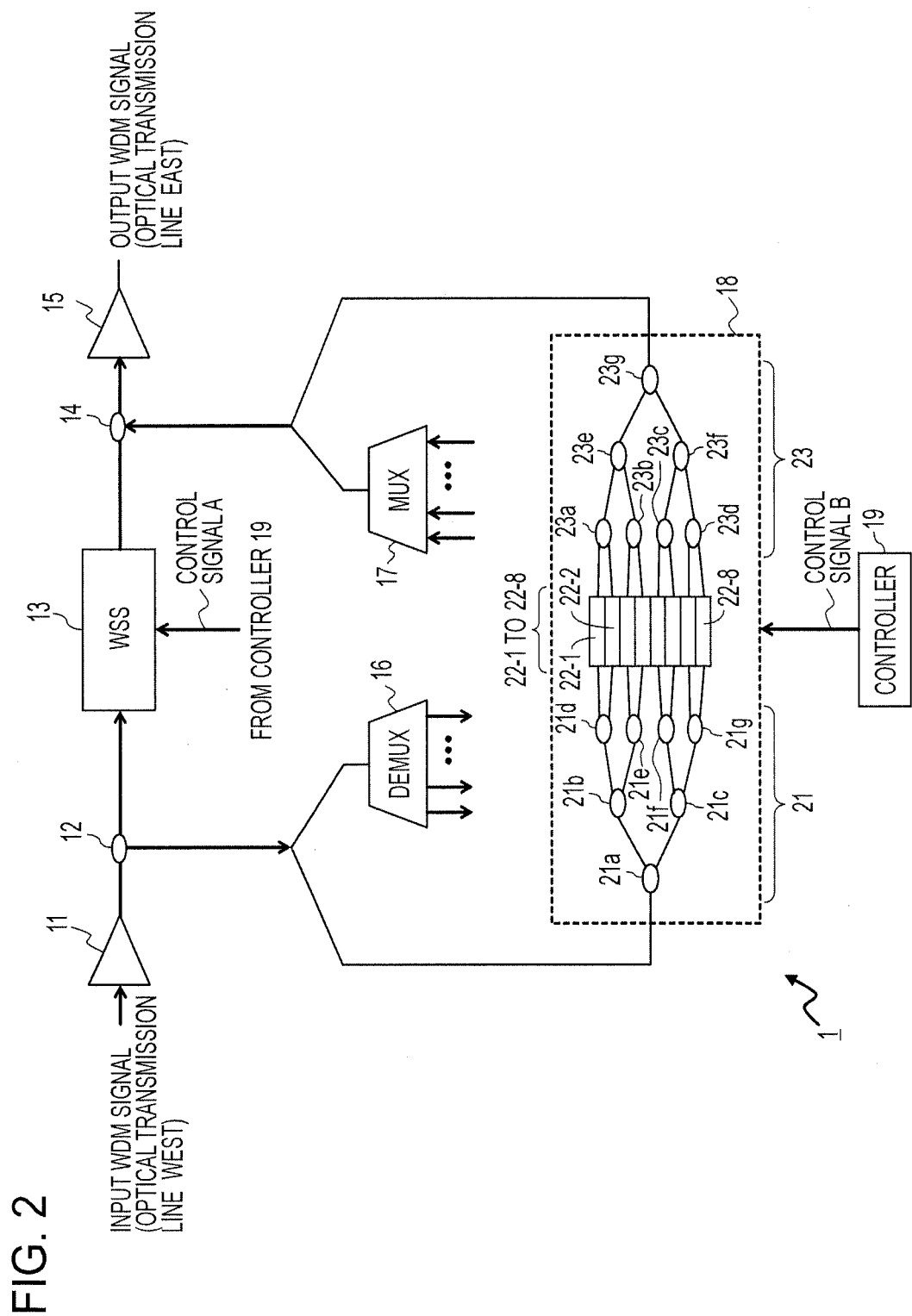
FIG. 2 illustrates a constitution of an optical transmission device of a first embodiment.

FIG. 2 illustrates a constitution of an optical transmission device of a first embodiment. The optical transmission device 1 of the first embodiment receives a WDM signal from an optical transmission line WEST, and transmits a WDM signal to an optical transmission line EAST. If the optical transmission device 1 mentioned here is, e.g., the optical add/drop multiplexer that the optical node device N1 illustrated in FIG. 1 is provided with, the optical transmission line WEST corresponds to the optical fiber transmission line which transmits an optical signal from the optical node N4 to the optical node N1, and the optical transmission line EAST corresponds to the optical fiber transmission line which transmits an optical signal from the optical node N1 to the optical node N2.

Further, the optical transmission device 1 extracts an optical signal of a specified wavelength from the input WDM signal (i.e., the WDM signal received via the optical transmission line WEST), and transfer the extracted optical signal to a client circuit. Still further, the optical transmission device 1 adds an optical signal received from the client circuit to the output WDM signal (i.e., the WDM signal transmitted via the optical transmission line EAST).

The optical transmission device 1 has an optical amplifier 11, an optical splitter 12, a wavelength selective switch (SSW) 13, an optical coupler 14, an optical amplifier 15, an optical demultiplexer (DEMUX) 16, an optical multiplexer (MUX) 17, an optical filter circuit 18 and a controller 19 as illustrated in FIG. 2. Then, a WDM signal is inputted to the optical transmission device 1.

Figure 3:
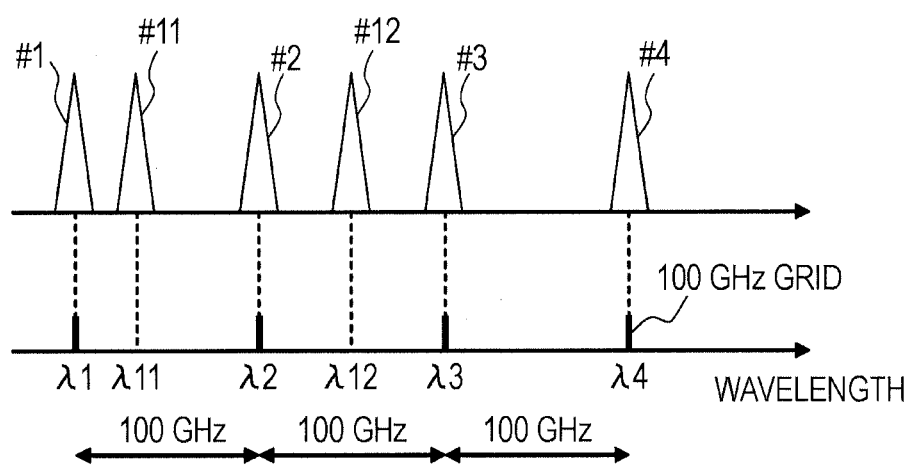

FIG. 3 illustrates an exemplary WDM signal inputted to the optical transmission device 1. The exemplary WDM signal includes optical signals #1-#4, #11 and #12. Wavelengths of the optical signals #1-#4 are $\lambda 1$-$\lambda 4$, respectively. The wavelengths $\lambda 1$-$\lambda 4$ are put on a predetermined wavelength grid (e.g., a 100 GHz grid conforming to the ITU-T Recommendation). That is, the optical signals #1-#4 are transmitted by the use of wavelengths on the wavelength grid. Further, wavelengths of the optical signals #11 and #12 are $\lambda 11$ and $\lambda 12$, respectively. Neither $\lambda 11$ nor $\lambda 12$ is put on the predetermined wavelength grid. That is, the optical signal #11 is transmitted by the use of a wavelength not being put on the predetermined wavelength grid, and so is the optical signal #12.

The optical amplifier 11 is a pre-amplifier which amplifies the input WDM signal. Further, the optical amplifier 11 is, e.g., an EDFA (Erbium Doped Fiber Amplifier).

The optical splitter 12 splits the WDM signal amplified by the optical amplifier 11 and transfers the split signals to the wavelength selective switch 13, the optical demultiplexer 16 and the optical filter circuit 18. Incidentally, the optical splitter 12 exemplarily illustrated in FIG. 2 splits the input WDM signal into two signals. Then, the one WDM signal is transferred to the wavelength selective switch 13, and the other WDM signal is further split and transferred to the optical demultiplexer 16 and the optical filter circuit 18. The optical splitter 12 is not limited to the above constitution, though. That is, the optical splitter 12 may split the input WDM signal into three or more signals.

The wavelength selective switch 13 selects an optical signal on the predetermined wavelength grid from the input WDM signal. The wavelength selective switch 13 of this example selects an optical signal specified by the controller 19 from a plurality of optical signals put on the 100 GHz grid. The wavelength selective switch 13 exemplarily illustrated in FIG. 3 may select one of the optical signals #1-#4 transmitted by the use of the wavelengths $\lambda 1$-$\lambda 4$ on the wavelength grid as specified by the controller 19.

The optical coupler 14 combines optical signals which are each selected by the wavelength selective switch 13, outputted from the optical multiplexer 17 and the optical filter circuit 18 together. Incidentally, the optical coupler 14 exemplarily illustrated in FIG. 2 has two input ports. Then, the optical signal selected by the wavelength selective switch 13 is transferred to the one input port of the optical coupler 14. Further, the optical signals outputted from the optical multiplexer 17 and the optical filter circuit 18 are coupled together and transferred to the other input port of the optical coupler 14. The optical coupler 14 is not limited to the above constitution, though. That is, the optical coupler 14 may have three or more input ports. In this case, the optical signal selected by the wavelength selective switch 13 and the optical signals outputted from the optical multiplexer 17 and the optical filter circuit 18 are each transferred to the input ports of the optical coupler 14 which are different from one another.

The optical amplifier 15 is a post-amplifier which amplifies an optical signal outputted by the optical coupler 14 (i.e., an output WDM signal). Further, the optical amplifier 15 is, e.g., an erbium doped fiber amplifier (EDFA).

The optical demultiplexer 16 separates an optical signal included in the input WDM signal on a wavelength-by-wavelength basis. The optical demultiplexer 16 mentioned here separates an optical signal, e.g., put on the 100 GHz grid on a wavelength-by-wavelength basis. The optical demultiplexer 16 separates the optical signals #1-#4 from one another, and outputs them via different output ports, as exemplarily illustrated in FIG. 3. Incidentally, an optical signal of another wavelength included in the input WDM signal is cut off by the optical demultiplexer 16. Then, output signals of the optical demultiplexer 16 are each transferred to a corresponding client circuit, e.g., via a transponder. That is, optical signals of specified wavelengths are extracted from the input WDM signal, and are transmitted to client devices.

The optical multiplexer 17 wavelength-multiplexes optical signals transferred thereto via the client circuits. A transponder, e.g., may be provided between each of the client circuits and the optical multiplexer 17. Wavelengths of the optical signals transferred via the respective client circuits are different from one another. Further, suppose that the wavelengths of the optical signals transferred via the respective client circuits are put on the 100 GHz grid. Then, an output signal of the optical multiplexer 17 is transferred to the optical coupler 14. That is, signals transmitted from the client devices are added to the WDM signal.

The WDM signal split by the optical splitter 12 is transferred to the optical filter circuit 18. Further, the optical filter circuit 18 includes an optical tunable filter which is tuned to a pass wavelength. That is, the optical filter circuit 18 selects an optical signal of a preferred wavelength from the input WDM signal. Then, an optical signal outputted by the optical filter circuit 18 is transferred to the optical coupler 14. Thus, the optical signal outputted by the optical filter circuit 18 is coupled with the optical signal selected by the wavelength selective switch 13 in the optical coupler 14.

The optical filter circuit 18 has a splitting circuit 21, a plurality of optical tunable filters 22-1 through 22-8, and a coupling circuit 23. Incidentally, although the optical filter circuit 18 exemplarily illustrated in FIG. 2 has eight optical tunable filters 22-1 through 22-8, the number of the optical tunable filters that the optical filter circuit 18 is provided with is not limited in particular.

The splitting circuit 21 splits the input WDM signal and transfers the split signals to the optical tunable filters 22-1 through 22-8. At this time, the splitting circuit 21 preferably transfers WDM signals of substantially equal power to the optical tunable filters 22-1 through 22-8. Incidentally, although FIG. 2 omits some of reference numerals, the eight optical tunable filters illustrated in FIG. 2 each represent the optical tunable filters 22-1, 22-2, 22-3 through 22-8 from top to bottom.

The splitting circuit 21 of the embodiment has optical splitters 21a-21g connected in a multistage form. The optical splitter 21a splits the input WDM signal and transfers the split signals to the optical splitters 21b and 21c. The optical splitter 21b splits the WDM signal outputted by the optical splitter 21a and transfers the split signals to the optical splitters 21d and 21e. The optical splitter 21c splits the WDM signal outputted by the optical splitter 21a and transfers the split signals to the optical splitters 21f and 21g. The optical splitter 21d splits the WDM signal outputted by the optical splitter 21b and transfers the split signals to the optical tunable filters 22-1 and 22-2. The optical splitter 21e splits the WDM signal outputted by the optical splitter 21b and transfers the split signals to the optical tunable filters 22-3 and 22-4. The optical splitter 21f splits the WDM signal outputted by the optical splitter 21c and transfers the split signals to the optical tunable filters 22-5 and 22-6. The optical splitter 21g splits the WDM signal outputted by the optical splitter 21c and transfers the split signals to the optical tunable filters 22-7 and 22-8. Incidentally, the optical splitters 21a-21g each equally split an optical input.

The optical tunable filters 22-1 through 22-8 are each tuned to a pass wavelength in accordance with a control signal from the controller 19. The optical tunable filters 22-1 through 22-8 may be tuned to pass wavelengths, e.g., in accordance with applied voltages. Further, the optical tunable filters 22-1 through 22-8 may be configured to be tuned to the pass wavelengths in accordance with another parameter.

The coupling circuit 23 combines the optical signals outputted by the optical tunable filters 22-1 through 22-8 together. The coupling circuit 23 of the embodiment has optical couplers 23a-23g connected in a multistage form. The optical coupler 23a couples optical signals outputted by the optical tunable filters 22-1 and 22-2 with each other. The optical coupler 23b couples optical signals outputted by the optical tunable filters 22-3 and 22-4 with each other. The optical coupler 23c couples optical signals outputted by the optical tunable filters 22-5 and 22-6 with each other. The optical coupler 23d couples optical signals outputted by the optical tunable filters 22-7 and 22-8 with each other. The optical coupler 23e couples optical signals outputted by the optical couplers 23a and 23b with each other. The optical coupler 23f couples optical signals outputted by the optical couplers 23c and 23d with each other. The optical coupler 23g couples optical signals outputted by the optical couplers 23e and 23f with each other.

The controller 19 controls operation of the optical transmission device 1 as instructed by a user or an administrator of the optical communication system including the optical transmission device 1. That is, the controller 19 specifies a wavelength to be selected by the wavelength selective switch 13 and pass wavelengths of the optical tunable filters 22-1 through 22-8. The controller 19 may carry out another process as well as the process for specifying the wavelengths. Incidentally, the controller 19 may have, although not limited to in particular, a processor which runs a control program and a memory.

The controller 19 produces a control signal A for controlling the wavelength selective switch 13 and a control signal B for controlling the optical filter circuit 18. The control signal A selects one or a plurality of optical signals put on the previously mentioned wavelength grid. As to an example illustrated in FIG. 3, the control signal A is a control signal used for selecting a preferred one of the optical signals #1-#4. Then, the wavelength selective switch 13 selects a wavelength specified by the control signal A from the input WDM signal. Incidentally, the optical signal selected by the control signal A from the plurality of optical signals included in the WDM signal from the optical transmission line WEST is outputted to the optical transmission line EAST. That is, the control signal A specifies one of the optical signals put on the wavelength grid which passes through the optical transmission device 1.

The control signal B is a control signal used for selecting one or a plurality of optical signals not being put on the previously mentioned wavelength grid. As exemplarily illustrated in FIG. 3, the control signal B selects a preferred one of the optical signals #11 and #12. Then, the optical filter circuit 18 selects a wavelength specified by the control signal B from the input WDM signal. Incidentally, the WDM signal coming from the optical transmission line WEST is split by the optical splitter 12 and then transferred to the optical filter circuit 18 as described above. Then, the output signal of the optical filter circuit 18 is transferred to the optical transmission line EAST via the optical coupler 14. That is, the control signal B may specify one of the optical signals not being put on the wavelength grid which passes through the optical transmission device 1.

Suppose that the WDM signal illustrated in FIG. 3 is inputted to the optical transmission device 1 constituted as described above. Suppose, here, that the optical signals #1-#4 are put on the 100 GHz grid. Suppose, further, that the optical signal #11 is not put on the 100 GHz grid, nor is the optical signal #12. In this case, the controller 19 produces a control signal A which makes the wavelength selective switch 13 select preferred one of the wavelengths $\lambda 1, \lambda 2, \lambda 3$ and $\lambda 4$. The controller 19 further produces a control signal B which makes, e.g., the optical tunable filters 22-1 and 22-2 select the wavelengths $\lambda 11$ and $\lambda 12$, respectively.

Then, the wavelength selective switch 13 selects the wavelength specified by the control signal A from the input WDM signal. If the control signal A specifies $\lambda 1$ and $\lambda 2$, e.g., the wavelength selective switch 13 extracts the optical signals #1 and #2 from the input WDM signal and outputs those optical signals.

Further, the optical filter circuit 18 selects the wavelength specified by the control signal B from the input WDM signal. If, e.g., the control signal B makes the optical tunable filters 22-1 and 22-2 select the wavelengths $\lambda 11$ and $\lambda 12$, respectively, the optical tunable filters 22-1 and 22-2 extract the optical signals #11 and #12 from the input WDM signal, respectively. That is, the optical filter circuit 18 extracts the optical signals #11 and #12 from the input WDM signal in accordance with the control signal B, and outputs those optical signals.

The optical demultiplexer 16 extracts preferred optical signals (limited to ones put on the 100 GHz grid, though) and transfers the extracted optical signals to the client circuits, as described above. Further, the optical multiplexer 17 adds optical signals (limited to ones put on the 100 GHz grid, though) received via the client circuits to the WDM signal.

The optical transmission device 1 works as an optical add/drop multiplexer as to optical signals put on the wavelength grid by the use of the wavelength selective switch 13, the optical demultiplexer 16 and the optical multiplexer 17, as described above. Further, the optical transmission device 1 transmits an optical signal not being put on the wavelength grid to a next optical node by the use of the optical filter circuit 18. The optical filter circuit 18 mentioned here has optical tunable filters 22-1 through 22-8 which each selects a preferred wavelength as instructed by the controller 19. That is, the optical transmission device 1 selectively transmits an optical signal of any wavelength not being put on the wavelength grid to a next optical node. In other words, the optical transmission device 1 achieves grid-less optical transmission not depending upon the wavelength grid.

Thus, in order that an optical communication system which uses the optical transmission device of the first embodiment increases throughput of WDM signal transmission, not only an optical signal put on the existing wavelength grid but an optical signal of any wavelength are added to a WDM signal. That is, the optical communication system of the first embodiment may increase the throughput of transmission by adding any wavelength not being put on the wavelength grid to a WDM signal without replacing the optical transmission device.

Incidentally, the optical signal outputted by the optical multiplexer 17 may be transferred not to the optical coupler 14 but to the wavelength selective switch 13, instead. In this case, the wavelength selective switch 13 selects a specified wavelength from the input WDM signal and selects a specified wavelength from the output signal of the optical multiplexer 17 as well, as instructed by the controller 19. Notice that the controller 19 controls the wavelength selective switch 13 in such a way that the wavelength selected from the input WDM signal and the wavelength selected from the output signal of the optical multiplexer 17 do not overlap each other.

Further, the wavelength selective switch 13 and the optical filter circuit 18 of the optical transmission device 1 illustrated in FIG. 2 select an optical signal put on the predetermined wavelength grid and an optical signal not being put on the predetermined wavelength grid from the WDM signal, respectively. The optical filter circuit 18 may pass any wavelength as controlled by the controller 19, though. Thus, the optical filter circuit 18 may select an optical signal put on the predetermined wavelength grid as well.

Second Embodiment

Figure 4:
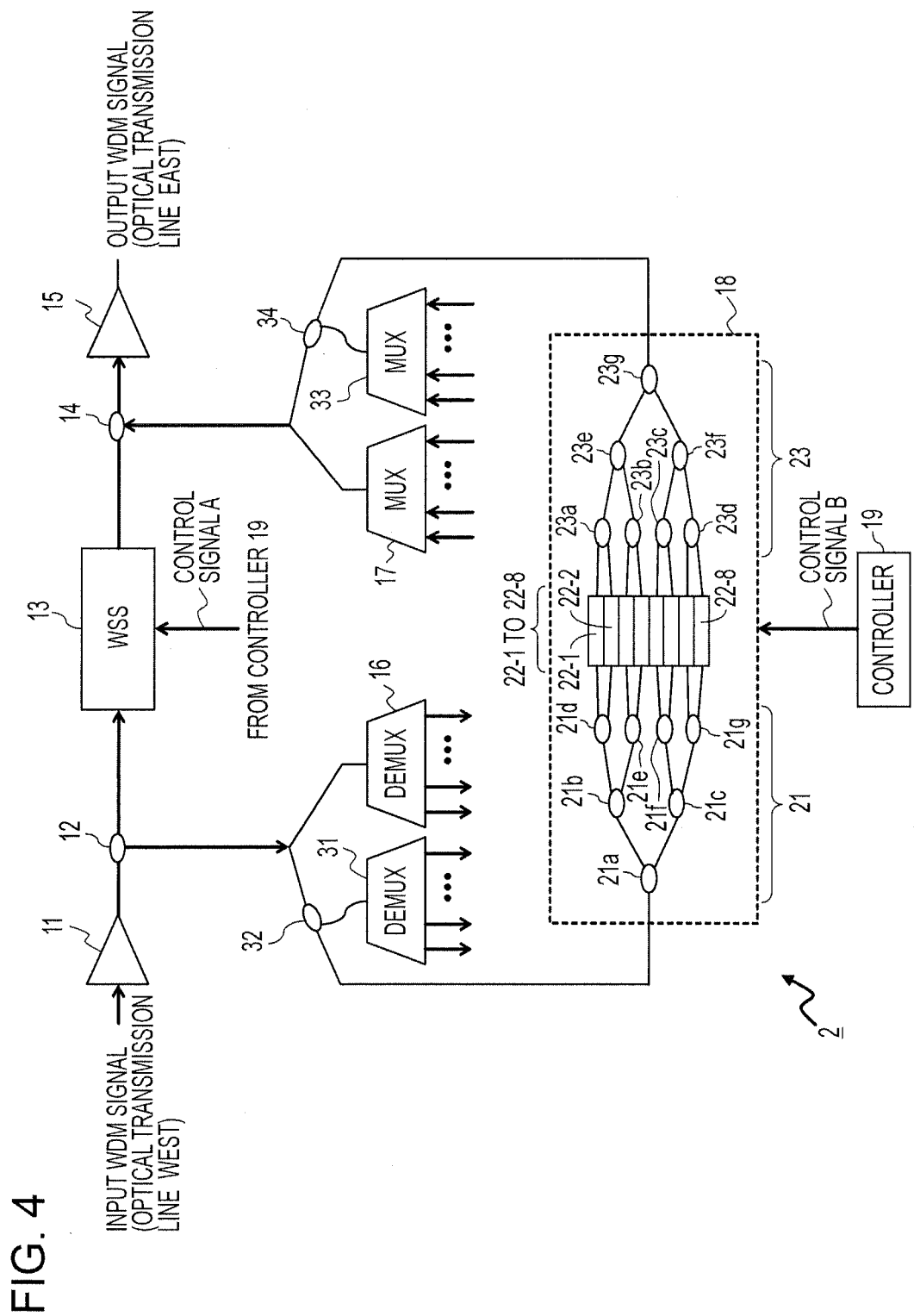
FIG. 4 illustrates a constitution of an optical transmission device of a second embodiment.

FIG. 4 illustrates a constitution of an optical transmission device of a second embodiment. The optical transmission device 2 of the second embodiment has an optical amplifier 11, an optical splitter 12, a wavelength selective switch 13, an optical coupler 14, an optical amplifier 15, an optical demultiplexer 16, an optical multiplexer 17, an optical filter circuit 18, a controller 19, an optical splitter 32, an optical demultiplexer 31, an optical multiplexer 33 and an optical coupler 34. Incidentally, the optical amplifier 11, the optical splitter 12, the wavelength selective switch 13, the optical coupler 14, the optical amplifier 15, the optical demultiplexer 16, the optical multiplexer 17, the optical filter circuit 18 and the controller 19 illustrated in FIG. 4 are substantially same as those of the first embodiment illustrated in FIG. 2.

Figure 5:
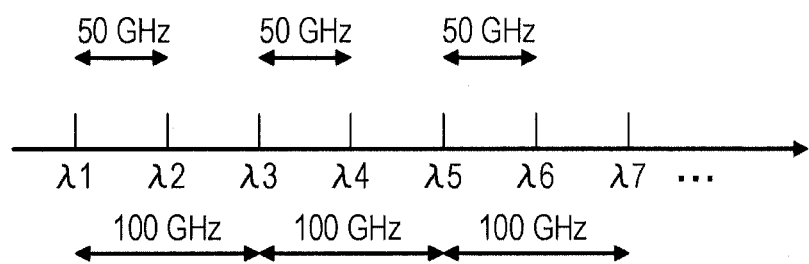
FIG. 5 illustrates an example of how wavelengths of a WDM signal are put.

The optical transmission device 2 of the embodiment is provided with an input WDM signal which transmits optical signals put at every 50 GHz space as illustrated in FIG. 5. In FIG. 5, wavelengths $\lambda 1, \lambda 3, \lambda 5$ and so on are put on a 100 GHz grid. Further, wavelengths $\lambda 2, \lambda 4, \lambda 6$ and so on are obtained if the wavelengths $\lambda 1, \lambda 3, \lambda 5$ and so on are shifted by 50 GHz, respectively.

The input WDM signal is transferred to the wavelength selective switch 13, the optical demultiplexer 16, the optical filter circuit 18 and the optical demultiplexer 31 by the use of the optical splitters 12 and 32. The wavelength selective switch 13 selects an optical signal on the 100 GHz grid from the WDM signal. That is, the wavelength selective switch 13 selects specified one of the wavelengths $\lambda 1, \lambda 3, \lambda 5$ and so on. The optical demultiplexer 16 separates an optical signal on the 100 GHz grid on a wavelength-by-wavelength basis, and transfers the separated optical signal to a client circuit. That is, the optical demultiplexer 16 separates optical signals of the wavelengths $\lambda 1, \lambda 3, \lambda 5$ and so on. The optical filter circuit 18 may select an optical signal not being put on the 100 GHz grid from the WDM signal. That is, the optical filter circuit 18 selects specified one of the wavelengths λ2, λ4, λ6 and so on.

The optical demultiplexer 31 separates an optical signal included in the WDM signal on a wavelength-by-wavelength basis, and transfers the separated optical signal to a client circuit. The optical demultiplexer 31 mentioned here may separate optical signals at every 50 GHz space. Optical signals on the 100 GHz grid are separated by the optical demultiplexer 16, though. Thus, the optical demultiplexer 31 may be configured to separate only an optical signal having a wavelength shifted by 50 GHz from the 100 GHz grid on a wavelength-by-wavelength basis. Otherwise, only an optical signal having a wavelength shifted by 50 GHz from the 100 GHz grid in the optical signals separated by the optical demultiplexer 31 on a wavelength-by-wavelength basis may be transferred to a client circuit. At any rate, the optical demultiplexer 31 transfers the optical signals of the wavelengths λ2, λ4, λ6 and so on to the respective client circuits corresponding to those wavelengths.

In this way, the optical transmission device 2 transfers an optical signal on the 100 GHz grid to a client circuit by the use of the optical demultiplexer 16. Further, the optical transmission device 2 transfers an optical signal not being put on the 100 GHz grid to a client circuit by the use of the optical demultiplexer 31.

The optical multiplexer 17 wavelength-multiplexes optical signals transferred via the client circuits, as described above. Incidentally, suppose that the wavelengths of the optical signals transmitted to the optical multiplexer 17 via the respective client circuits are put on the 100 GHz grid.

The optical multiplexer 33 wavelength-multiplexes optical signals transferred via the client circuits similarly as the optical multiplexer 17. The optical multiplexer 33 mentioned here wavelength-multiplexes optical signals at every 50 GHz space, provided that the optical signals transmitted to the optical multiplexer 33 via the respective client circuits each have a wavelength shifted by 50 GHz from the 100 GHz grid. Thus, the optical multiplexer 33 substantially wavelength-multiplexes optical signals of the wavelengths λ2, λ4, λ6 and so on. Incidentally, although the 50 GHz grid is supposed to be a condition for the operations of the optical demultiplexer 31 and the optical multiplexer 33 of the embodiment, it is not limited to such a condition. That is, the optical demultiplexer 31 and the optical multiplexer 33 may be another wavelength grid (e.g., 25 GHz space or 12.5 GHz space), or may be configured to be wavelength-tunable.

The optical transmission device 2 combines the optical signal selected by the wavelength selective switch 13, the optical signals outputted by the optical multiplexers 17 and 33, and the optical signal outputted by the optical filter circuit 18 together. That is, the optical transmission device 2 adds an optical signal on the 100 GHz grid to the WDM signal by the use of the optical multiplexer 17. Further, the optical transmission device 2 adds an optical signal not being put on the 100 GHz grid to the WDM signal by the use of the optical multiplexer 33. Incidentally, the wavelength selective switch 13 of the second embodiment may be configured to select the output signal of the optical multiplexer 17.

Then, how the optical transmission device 2 of the second embodiment works will be explained with reference to FIGS. 6 and 7. In FIGS. 6 and 7, the wavelengths λ1, λ3, λ5, λ7 and so on are wavelengths on the 100 GHz grid. Further, the wavelengths λ2, λ4, λ6 and so on are obtained if the wavelengths λ1, λ3, λ5 and so on are shifted by 50 GHz, respectively.

Figure 6A:
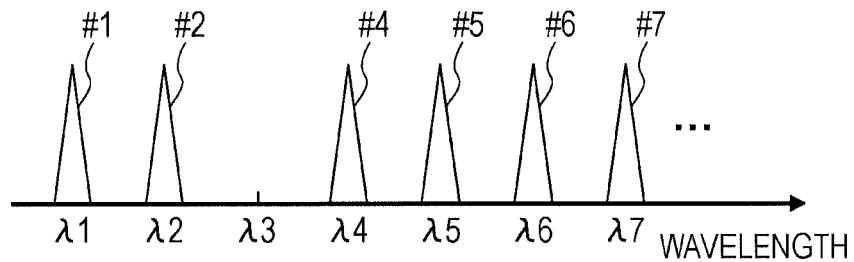
FIGS. 6A-6D illustrate first conditions of signals in the optical transmission device illustrated in FIG. 4.

Suppose that the optical transmission device 2 receives a WDM signal illustrated in FIG. 6A. This WDM signal includes optical signals #1, #2 and #4-#7. The optical signals #1, #5 and #7 transmits data by the use of the wavelengths λ1, λ5 and λ7, respectively. That is, the optical signals #1, #5 and #7 are put on the 100 GHz grid. Meanwhile, the optical signals #2, #4 and #6 transmits data by the use of the wavelengths λ2, λ4 and λ6, respectively. That is, neither the optical signals #2, #4 nor #6 are put on the 100 GHz grid. The optical signals #2, #4 and #6 are put on corresponding wavelengths shifted by 50 GHz from the 100 GHz grid.

The input WDM signal is amplified by the optical amplifier 11, and then transferred to the wavelength selective switch 13, the optical demultiplexers 16 and 31, and the optical filter circuit 18. That is, the wavelength selective switch 13, the optical demultiplexers 16 and 31, and the optical filter circuit 18 each receives the WDM signal including the optical signals #1, #2 and #4-#7.

Figure 6B:
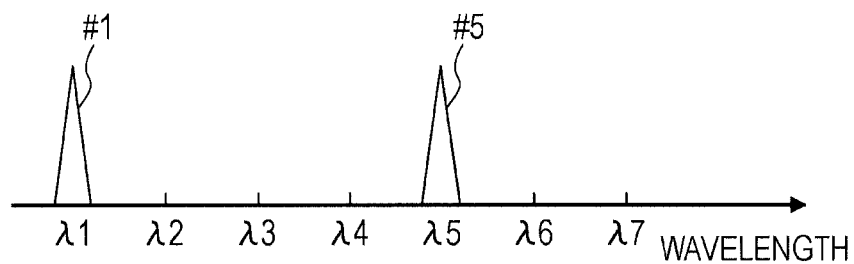

The wavelength selective switch 13 selects a wavelength specified from the WDM signal in accordance with a control signal A produced by the controller 19. Suppose here that the control signal A specifies the wavelengths λ1 and λ5. Incidentally, the control signal A specifies only wavelengths on the 100 GHz grid. Then, the wavelength selective switch 13 extracts the optical signals #1 and #5 and outputs the extracted optical signals as illustrated in FIG. 6B.

Incidentally, the wavelength selective switch 13 cuts off an optical signal not being put on the 100 GHz grid. That is, the optical signals #2, #4 and #6 are cut off on the wavelength selective switch 13. Further, the wavelength selective switch 13 does not output an optical signal not having been specified by the control signal A even if the optical signal is on the 100 GHz grid. That is, the wavelength selective switch 13 does not output the optical signal #7.

Figure 6C:
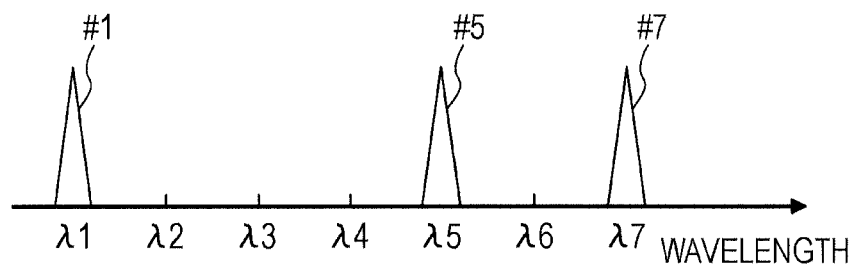

The optical demultiplexer 16 separates optical signals put on the 100 GHz grid on a wavelength-by-wavelength basis and outputs the separated optical signals. That is, the optical demultiplexer 16 outputs the optical signals #1, #5 and #7 as illustrated in FIG. 6C. At this time, the optical signals #1, #5 and #7 are each outputted via a distinctive output port and transferred to a corresponding client circuit. In this way, the optical transmission device 2 extracts the optical signals #1, #5 and #7 from the input WDM signal and transfers each of the extracted optical signals to the corresponding client circuit.

Figure 6D:
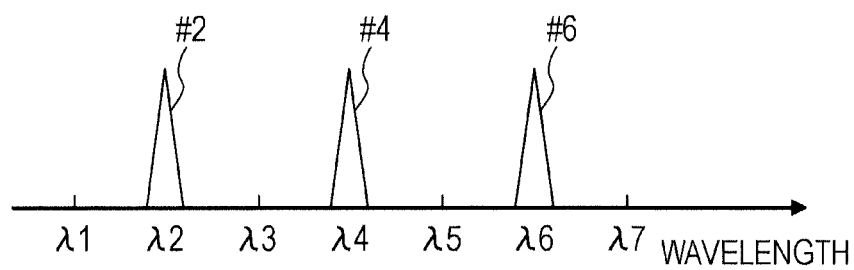

The optical demultiplexer 31 separates optical signals put on a grid shifted by 50 GHz from the 100 GHz grid on a wavelength-by-wavelength basis and outputs the separated optical signals. That is, the optical demultiplexer 31 outputs the optical signals #2, #4 and #6 as illustrated in FIG. 6D. At this time, the optical signals #2, #4 and #6 are each outputted via a distinctive output port and transferred to a corresponding client circuit. In this way, the optical transmission device 2 extracts the optical signals #2, #4 and #6 from the input WDM signal and transfers each of the extracted optical signals to the corresponding client circuit.

Figure 7A:
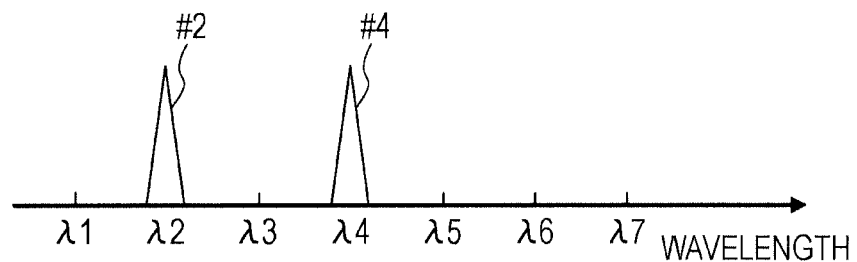
FIGS. 7A-7D illustrate second conditions of signals in the optical transmission device illustrated in FIG. 4.

The optical filter circuit 18 selects an optical signal having a wavelength specified from the WDM signal in accordance with the control signal B produced by the controller 19. Suppose here that the control signal B specifies the wavelengths λ2 and λ4. Incidentally, the control signal B may specify an optional or preferred wavelength without depending on the wavelength grid. Then, the optical filter circuit 18 extracts the optical signals #2 and #4 and outputs the extracted optical signals as illustrated in FIG. 7A.

Figure 7B:
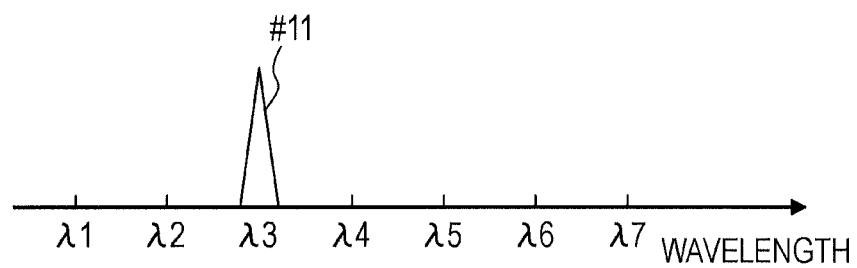

The optical multiplexer 17 receives the optical signal #11 via a client circuit. The wavelength of the optical signal #11 is 23 as illustrated in FIG. 7B. The optical multiplexer 17 mentioned here wavelength-multiplexes an optical signal put on the 100 GHz grid as described above. Thus, the optical multiplexer 17 outputs the optical signal #11.

Figure 7C:
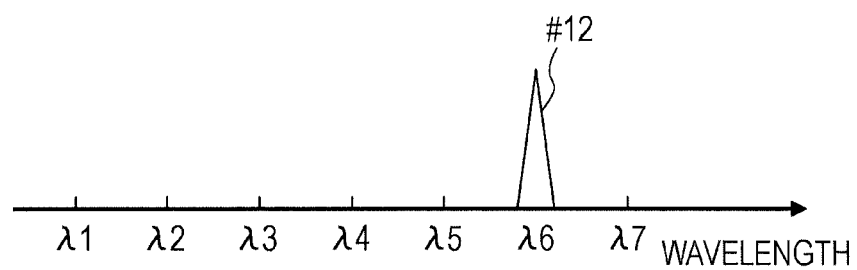

The optical multiplexer 33 receives the optical signal #12 via a client circuit. The wavelength of the optical signal #12 is as illustrated in FIG. 7C. The optical multiplexer 33 mentioned here wavelength-multiplexes an optical signal put on a wavelength shifted by 50 GHz from the 100 GHz grid as described above. Thus, the optical multiplexer 33 outputs the optical signal #12.

Figure 7D:
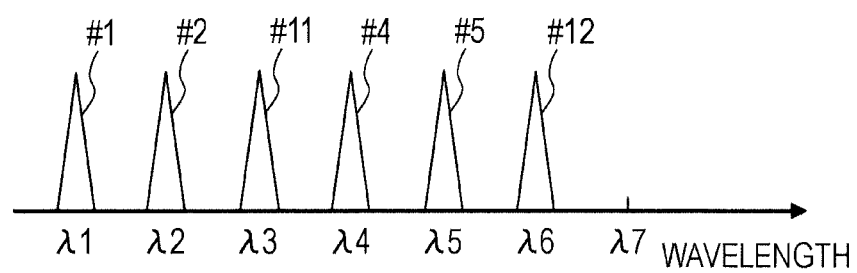

The wavelength selective switch 13 outputs the optical signals #1 and #5 as illustrated in FIG. 6B. The optical filter circuit 18 outputs the optical signals #2 and #4 as illustrated in FIG. 7A. The optical multiplexer 17 outputs the optical signal #11 as illustrated in FIG. 7B. The optical multiplexer 33 outputs the optical signal #12 as illustrated in FIG. 7C. Then, the optical transmission device 2 combines the optical signals outputted from the wavelength selective switch 13, the optical filter circuit 18 and the optical multiplexers 17 and 33 together by the use of the optical couplers 14 and 34. As a result, a WDM signal including the optical signals #1, #2, #11, #4, #5 and #12 is produced as illustrated in FIG. 7D. Further, the optical amplifier 15 amplifies and outputs this WDM signal.

The optical transmission device 2 of the second embodiment works as an optical add/drop multiplexer for an optical signal not being put on the 100 GHz grid as well as for an optical signal on the 100 GHz grid in this way. Thus, not only an optical signal on the existing wavelength grid but an optical signal of any wavelength is added in the optical communication system which uses the optical transmission device of the second embodiment. That is, according to the second embodiment, the optical communication system may enhance the transmission throughput without replacing the optical add/drop multiplexer by adding any wavelength not being put on the wavelength grid to the WDM signal.

Incidentally, the optical transmission devices of the first and second embodiments may each have an optical amplifier in addition to the optical amplifiers 11 and 15 so as to secure a regular optical power level. Arrangements and gains of the respective optical amplifiers are determined, e.g., on the basis of simulation, measurement, etc.

Modification of the Optical Filter Circuit 18

The optical filter circuit 18 of the first and second embodiments has the splitting circuit 21, the optical tunable filters 224 through 22-8 and the coupling circuit 23. The optical filter circuit 18 is not limited to the constitution illustrated in FIG. 2 or FIG. 4, though. That is, the optical filter circuit 18 may be implemented in another constitution.

Figure 8A:
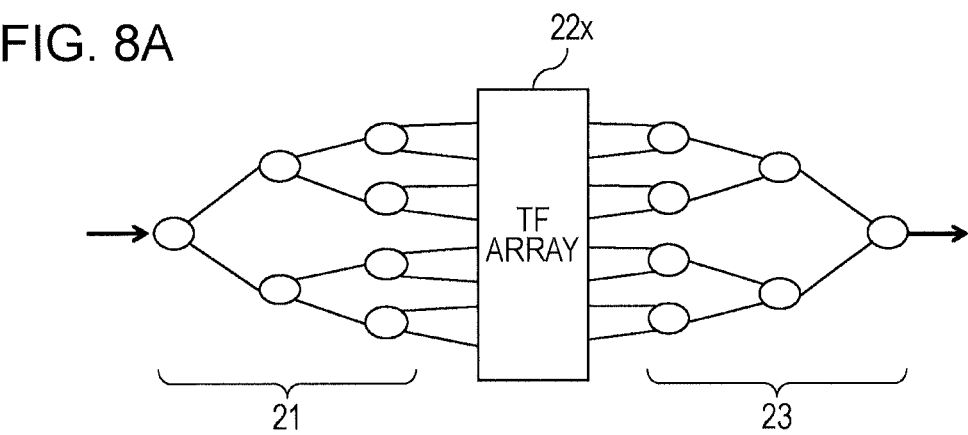
FIGS. 8A-8C illustrate modifications of an optical filter circuit.

As exemplarily illustrated in FIG. 8A, the optical tunable filters 22-1 through 22-8 are replaced with an optical tunable filter array 22X. Suppose, in this case, that the optical tunable filter array 22X has eight input ports and eight output ports, and provides a filtering function equivalent to that of the optical tunable filters 22-1 through 22-8. The optical tunable filters 22-1 through 22-8 are replaced with the optical tunable filter array 22X, so that the optical filter circuit 18 is downsized.

Figure 8B:
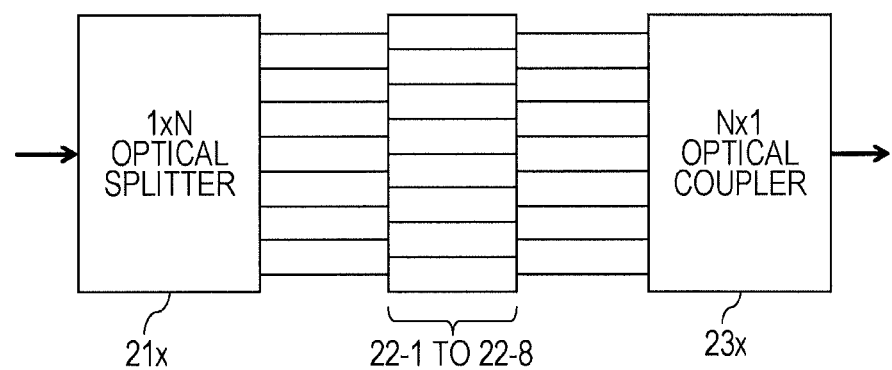

As exemplarily illustrated in FIG. 8B, the splitting circuit 21 is implemented by a 1×N optical splitter 21X, and the coupling circuit 23 is implemented by an N×1 optical coupler 23X. Let N=8 as to the embodiment. The replacement of the optical splitters 21a-21g with the 1×N optical splitter 21X in this way may reduce the amount of optical loss depending upon the constitution of the 1×N optical splitter 21X. Similarly, the replacement of the optical couplers 23a-23g with the N×1 optical coupler 23X may reduce the amount of optical loss depending upon the constitution of the N×1 optical coupler 23X.

Figure 8C:
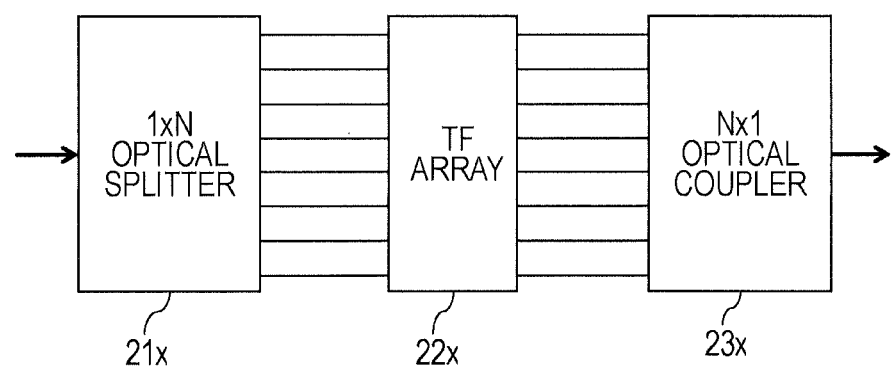

As exemplarily illustrated in FIG. 8C, the optical tunable filters 22-1 through 22-8 are replaced with the optical tunable filter array 22X, the splitting circuit 21 is implemented by the 1×N optical splitter 21X, and the coupling circuit 23 is implemented by the N×1 optical coupler 23X. Incidentally, the constitutions illustrated in FIGS. 8A-8C may be employed for both the first and second embodiments.

Adjustment of Optical Filter Circuit 18

The optical filter circuit 18 has the optical tunable filters 22-1 through 22-8 which are each tunable to a pass wavelength as described above. Then, the pass wavelength of each of the optical tunable filters 22-1 through 22-8 is adjusted by the controller 19.

Figure 9A:
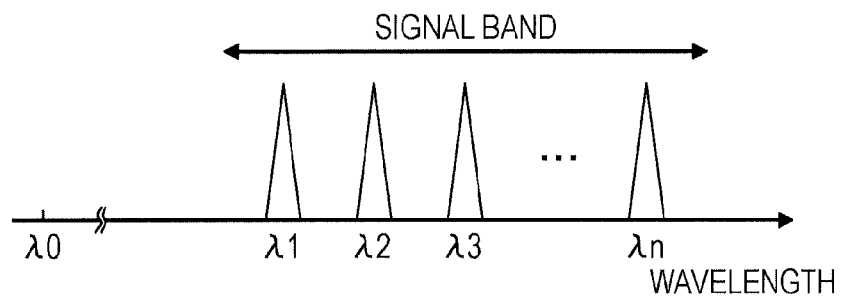
FIGS. 9A and 9B illustrate tuning of pass wavelengths.

Suppose, as explained below, that the optical filter circuit 18 extracts an optical signal #2 from a WDM signal illustrated in FIG. 9A. Further, suppose that the optical filter circuit 18 extracts the optical signal #2 by using the optical tunable filter 22-1. In this case, the controller 19 produces a control signal for tuning the pass wavelength of the optical tunable filter 22-1 to $\lambda 2$.

The controller 19 adjusts the pass wavelength of the optical tunable filter 22-1, e.g., by controlling a voltage applied to the optical tunable filter 22-1. In this case, the voltage applied to the optical tunable filter 22-1 gradually gets closer to a target voltage corresponding to the wavelength $\lambda 2$. Then, the pass wavelength of the optical tunable filter 22-1 gradually gets closer to $\lambda 2$ from the outside of a signal bandwidth. That is, the pass wavelength of the optical tunable filter 22-1 gradually gets closer from $\lambda 0$ to $\lambda 2$ in a period of time for tuning adjustment described above.

Figure 9B:
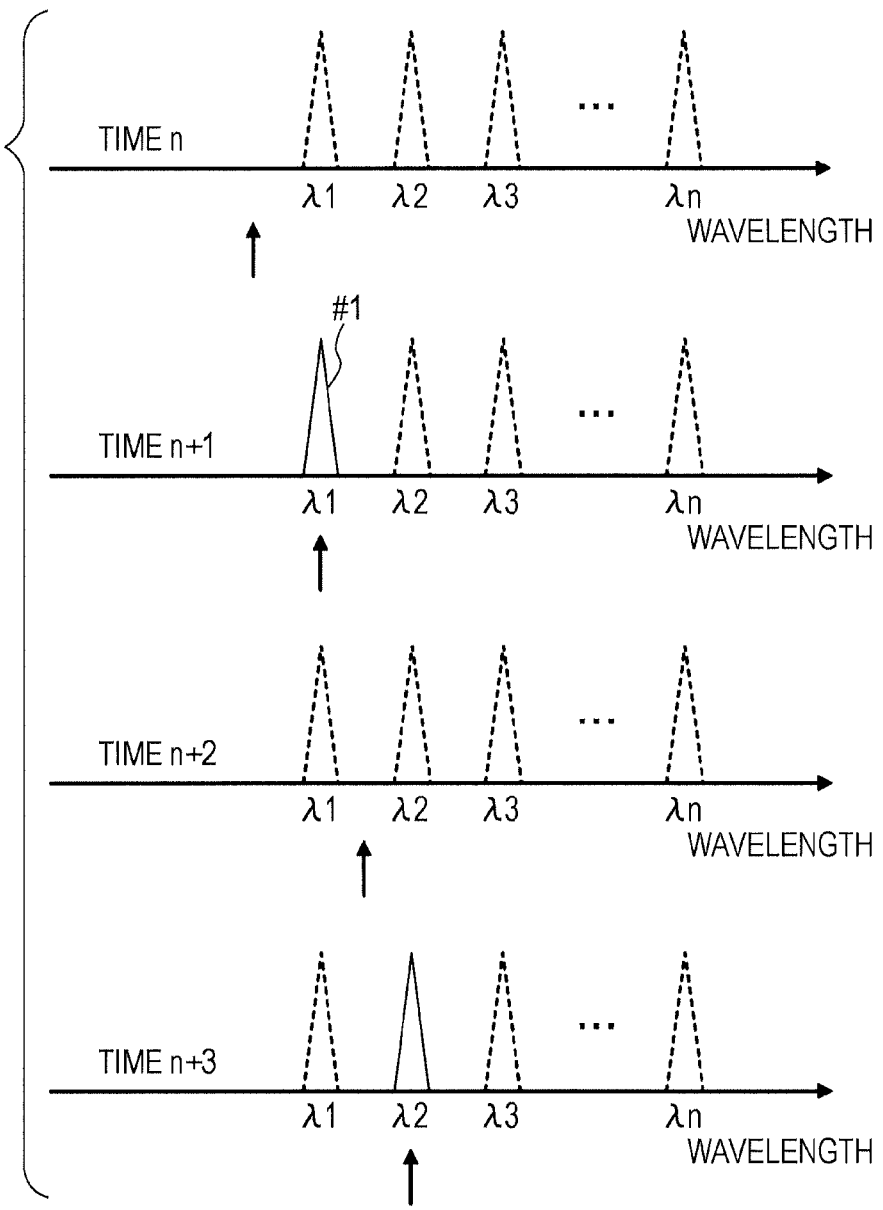

FIG. 9B illustrates states of the pass wavelength and the output of the optical tunable filter 22-1 in the period of time for tuning adjustment. Incidentally, suppose that the WDM signal illustrated in FIG. 9A is inputted to the optical filter circuit 18. Further, arrows illustrated in FIG. 9B each indicate one of the respective pass wavelengths at times n through n+3.

At the time n, the pass wavelength of the optical tunable filter 22-1 is shorter than and the respective optical signals are cut off by the optical tunable filter 22-1. In a process in which the pass wavelength of the optical tunable filter 22-1 gradually gets closer from $\lambda 0$ to $\lambda 2$, however, the pass wavelength temporarily turns to be $\lambda 1$. As exemplarily illustrated in FIG. 9B, the pass wavelength of the optical tunable filter 22-1 is $\lambda 1$ at the time n+1. Then, if the pass wavelength of the optical tunable filter 22-1 is $\lambda 1$, the optical signal #1 passes on the optical tunable filter 22-1. That is, the optical filter circuit 18 ends up temporarily outputting the optical signal #1 in the period of time for tuning adjustment described above.

If, e.g., the wavelength selective switch 13 or the other optical tunable filters 22-2 through 22-8 select the optical signal #1 at this time, two optical signals #1 mismatched in phase with each other merge and cause quality degradation of the optical signal #1.

When the controller 19 adjusts the wavelengths to be passed by the optical tunable filters 22-1 through 22-8, the optical filter circuit 18 may possibly extract and output an unnecessary optical signal in this way. Thus, it is preferable that the optical filter circuit 18 has a function to avoid outputting an unnecessary optical signal in a period of time for adjusting a pass wavelength. This function is sometimes called a signal cut-off function as explained below.

Figure 10:
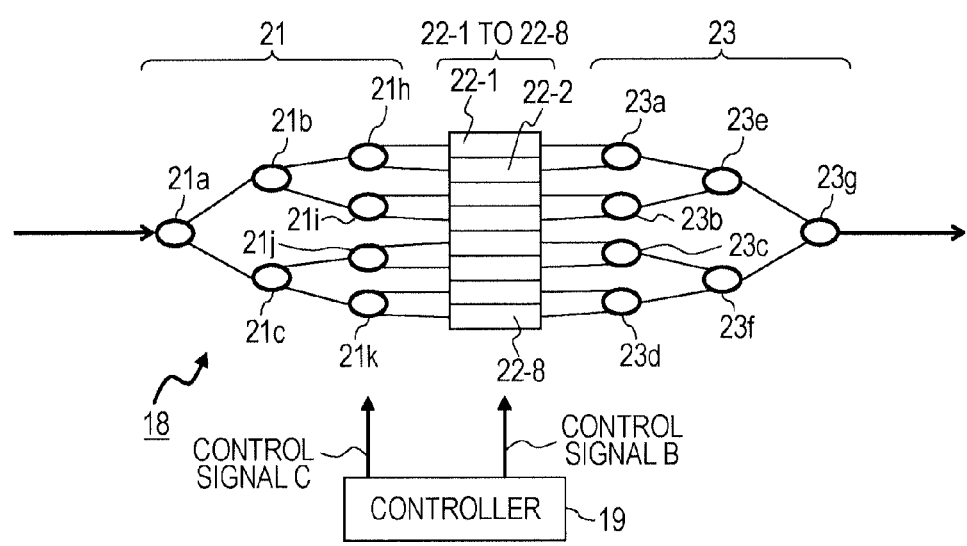
FIG. 10 illustrates a first exemplary optical filter circuit having a signal cut off function.

FIG. 10 illustrates an exemplary optical filter circuit 18 having a signal cut-off function. Incidentally, the optical filter circuit 18 has the splitting circuit 21, the optical tunable filters 22-1 through 22-8 and the coupling circuit 23 as described above.

The splitting circuit 21 exemplarily illustrated in FIG. 10 has optical splitters 21a-21c and variable optical splitters 21h-21k. The optical splitters 21a-21c work as described above. Thus, an input WDM signal is split by the optical splitters 21a-21c and transferred to the variable optical splitters 21h-21k.

The variable optical splitter 21h splits a WDM signal outputted by the optical splitter 21b and transfers the split optical signals to the optical tunable filters 22-1 and 22-2. The variable optical splitter 21i splits a WDM signal outputted by the optical splitter 21b and transfers the split optical signals to the optical tunable filters 22-3 and 22-4. The variable optical splitter 21j splits a WDM signal outputted by the optical splitter 21c and transfers the split optical signals to the optical tunable filters 22-5 and 22-6. The variable optical splitter 21k splits a WDM signal outputted by the optical splitter 21c and transfers the split optical signals to the optical tunable filters 22-7 and 22-8.

The variable optical splitters 21h-21k each adjusts a splitting ratio as instructed by the controller 19 (by means of a control signal C in FIG. 10). If the optical filter circuit 18 regularly works (i.e., does not tune the optical tunable filters 22-1 and 22-8 to the pass wavelengths), the controller 19 controls and makes the splitting ratio of each of the variable optical splitters 21h-21k 50/50. Thus, if the optical filter circuit 18 regularly works, the optical tunable filters 22-1 and 22-8 are each provided with WDM signals of substantially equal power.

While adjusting a pass wavelength of a certain optical tunable filter, on the other hand, the controller 19 controls a splitting ratio of a corresponding variable optical splitter by the use of the control signal C in such a way as to reduce optical input power to the optical tunable filter. In order, e.g., that the optical tunable filter 22-1 is tuned to the pass wavelength, the controller 19 controls a splitting ratio of the variable optical splitter 21h in such a way as to reduce optical input power to the optical tunable filter 22-1. At this time, the controller 19 controls and makes the splitting ratio of the variable optical splitter 21h, e.g., 0/100. Then, the optical input to the optical tunable filter 22-1 is cut off by the variable optical splitter 21h.

While the optical input to the optical tunable filter 22-1 is being cut off, the controller 19 then sets a voltage to be applied to the optical tunable filter 22-1 to a target voltage by using the control signal B. After the voltage applied to the optical tunable filter 22-1 becomes steady, the controller 19 then gets the splitting ratio of the variable optical splitter 21h back to 50/50.

Before the voltage applied to the optical tunable filter of the constitution described above becomes steady, the optical input to the optical tunable filter is cut off. Thus, the optical tunable filter being adjusted does never output an unnecessary optical signal.

If, however, the splitting ratio of the variable optical splitter 21h is controlled and made 0/100 in order that the optical input to the optical tunable filter 22-1 of the constitution illustrated in FIG. 10 is cut off, the optical input power to the optical tunable filter 22-2 increases. Thus, if the optical tunable filter 22-2 extracts an optical signal from the WDM signal and outputs the extracted optical signal, its optical output power may possibly be greater than optical output power of other optical tunable filters, resulting in imbalance of power among the optical signals in the WDM signal.

Figure 11A:
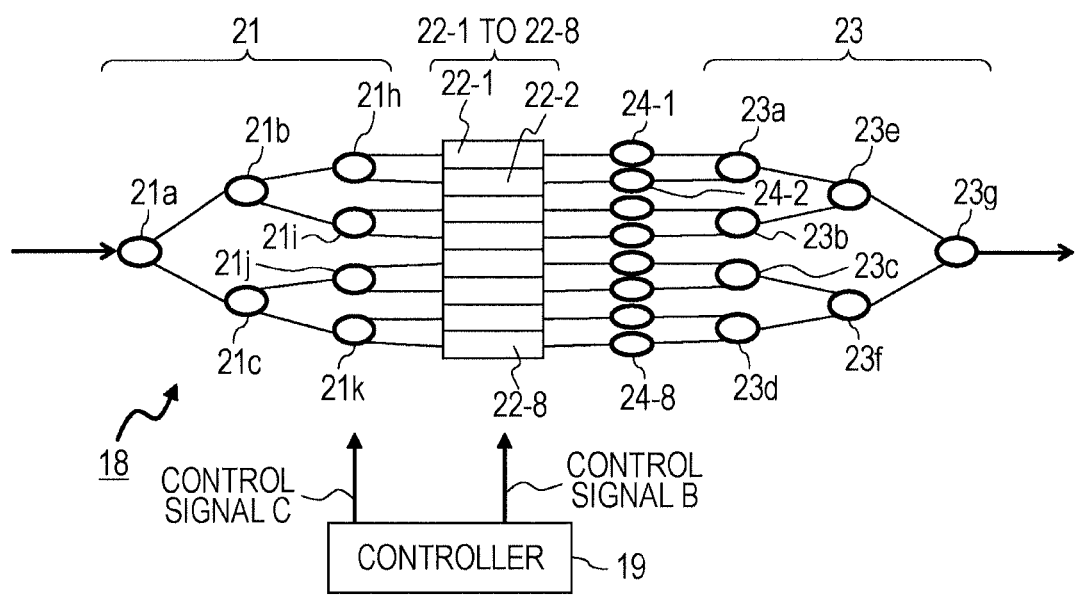
FIGS. 11A and 11B illustrate a second exemplary optical filter circuit having a signal cut off function.
Figure 11B:
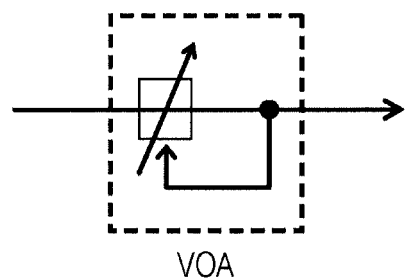

This problem is solved or alleviated if, e.g., the optical tunable filters 22-1 through 22-8 are provided with variable optical attenuators 24-1 through 24-8, respectively, as illustrated in FIG. 11A. The variable optical attenuators 24-1 through 24-8 each keep a constant optical level by the use of feedback control, e.g., as illustrated in FIG. 11B.

If, e.g., the pass wavelength of the optical tunable filter is adjusted, the controller 19 controls and makes the splitting ratio of the variable optical splitter 21h 0/100 as described above. Then, while the optical input to the optical tunable filter 22-1 is cut off, the optical output power of the optical tunable filter 22-2 increases. At this time, the variable optical attenuator 24-2 provided to the optical tunable filter 22-2 works so as to keep the constant optical level. That is, a change of the output power of the optical tunable filter 22-2 being adjusted is compensated for by the variable optical attenuator 24-2.

Incidentally, if the optical input to the optical tunable filter 22-1 is cut off as described above, the variable optical attenuator 24-1 provided to the optical tunable filter 22-1 may possibly work unstably. Thus, the controller 19 may stop the variable optical attenuator 24-1 from working in this case. Further, although FIG. 11A illustrates an example in which the variable optical attenuators 24-1 through 24-8 are provided on output sides of the optical tunable filters 22-1 through 22-8, the variable optical attenuators 24-1 through 24-8 may be provided on input sides of the optical tunable filters 22-1 through 22-8.

Figure 12:
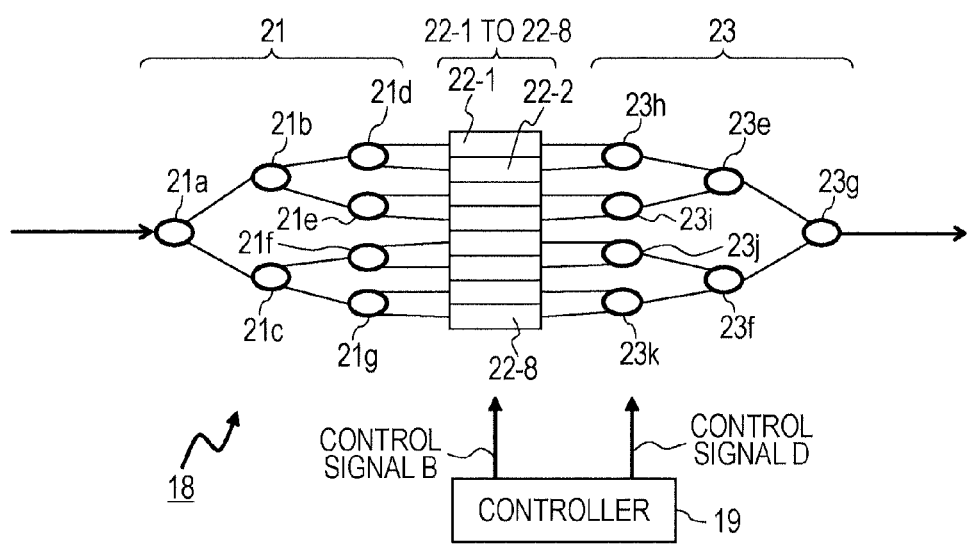
FIG. 12 illustrates a third exemplary optical filter circuit having a signal cut off function.

FIG. 12 illustrates another example of the optical filter circuit 18 having a signal cut-off function. The splitting circuit 21 and the optical tunable filters 22-1 through 22-8 in the optical filter circuit 18 illustrated in FIG. 12 are identical to those explained with reference to FIG. 2. That is, the splitting circuit 21 has the optical splitters 21a-21g, splits the input WDM signal and transfers the split signals to the optical tunable filters 22-1 through 22-8. Further, the optical tunable filters 22-1 through 22-8 each controls the pass wavelength in accordance with the control signal B produced by the controller 19.

The coupling circuit 23 has variable optical couplers 23h-23k and optical couplers 23e-23g. The variable optical couplers 23h-23k each couples optical outputs of the corresponding two optical tunable filters similarly as the optical couplers 23a-23d illustrated in FIG. 2. Then, the optical couplers 23e-23g couple optical outputs of the variable optical couplers 23h-23k together.

The variable optical couplers 23h-23k each adjusts a coupling ratio as instructed by the controller 19 (by means of a control signal D in FIG. 12). If the optical filter circuit 18 regularly works (i.e., does not adjust the pass wavelengths of the optical tunable filters 22-1 through 22-8), the controller 19 controls and makes the coupling ratio of each of the variable optical couplers 23h-23k 50/50.

While a pass wavelength of a certain optical tunable filter is being adjusted, the controller 19 controls a coupling ratio of a corresponding variable optical coupler by using the control signal D in such a way as to reduce optical output power of the optical tunable filter. If, e.g., the pass wavelength of the optical tunable filter 22-1 is adjusted, the controller 19 controls the coupling ratio of the variable optical coupler 23h in such a way as to reduce the optical output power of the optical tunable filter 22-1. At this time, e.g., the controller 19 controls and makes the coupling ratio of the variable optical coupler 23h 0/100. Then, the optical output of the optical tunable filter 22-1 is cut off by the variable optical coupler 23h.

While the optical output of the optical tunable filter 22-1 is being cut off, the controller 19 then sets the voltage applied to the optical tunable filter 22-1 to the target voltage by using the control signal B. After the voltage applied to the optical tunable filter 22-1 becomes steady, the controller 19 then gets the coupling ratio of the variable optical coupler 23h back to 50/50.

Before a voltage applied to an optical tunable filter of the constitution described above becomes steady, the optical output of the optical tunable filter is cut off. Thus, while a pass wavelength of a certain optical tunable filter is being adjusted, the optical tunable filter does never output an unnecessary optical signal.

Incidentally, the optical tunable filters 22-1 through 22-8 may be provided with the variable optical attenuators 24-1 through 24-8, respectively, in the optical filter circuit 18 illustrated in FIG. 12 similarly as in the constitution illustrated in FIG. 11A. In this case, the variable optical attenuators 24-1 through 24-8 may be provided on any of the input and outputs sides of the optical tunable filters 22-1 through 22-8.

Figure 13:
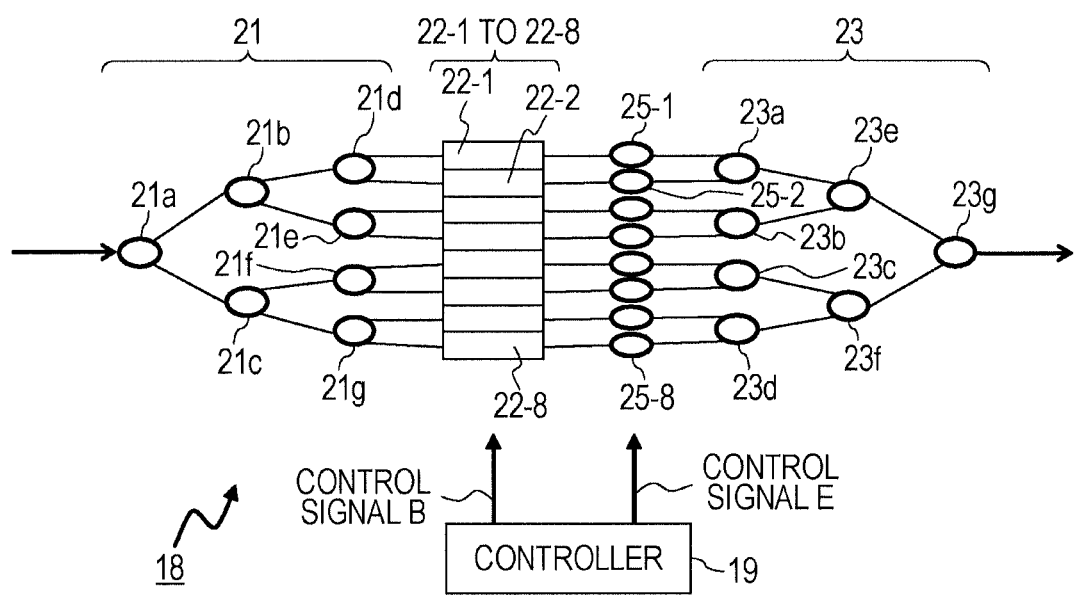
FIG. 13 illustrates a fourth exemplary optical filter circuit having a signal cut off function.

FIG. 13 illustrates still another example of the optical filter circuit 18 having a signal cut off function. The optical filter circuit 18 illustrated in FIG. 13 includes the optical splitters 21a-21g, the optical tunable filters 22-1 through 22-8 and the optical couplers 23a-23g which are substantially the same as those illustrated in FIG. 2. The optical filter circuit 18 illustrated in FIG. 13 includes, however, variable optical attenuators 25-1 through 25-8 provided to the optical tunable filters 22-1 through 22-8, respectively. The variable optical attenuators 25-1 through 25-8 may be provided as part of the coupling circuit 23, or out of the coupling circuit 23.

The variable optical attenuators 25-1 through 25-8 each adjusts an attenuation level as instructed by the controller 19 (by means of a control signal E in FIG. 13). If the optical filter circuit 18 regularly works (i.e., does not adjust the pass wavelengths of the optical tunable filters 22-1 and 22-8), the controller 19 controls and minimizes the attenuation levels of the variable optical attenuators 25-1 through 25-8. In this case, the optical outputs of the optical tunable filters 22-1 and 22-8 are not substantially attenuated and are transferred to the corresponding optical couplers 23a-23d. Otherwise, if the optical filter circuit 18 regularly works, the variable optical attenuators 25-1 through 25-8 may be controlled so that the attenuation levels are fixed.

While adjusting a pass wavelength of a certain optical tunable filter, the controller 19 controls an attenuation level of a corresponding variable optical attenuator by the use of the control signal E in such a way as to reduce optical output power of the optical tunable filter. In order to adjust the pass wavelength of the optical tunable filter 22-1, e.g., the controller 19 controls an attenuation level of the variable optical attenuator 25-1 in such a way as to reduce optical output power of the optical tunable filter 22-1. At this time, the controller 19 controls and maximizes the attenuation level of the variable optical attenuator 25-1. Then, the optical output of the optical tunable filter 22-1 is substantially cut off by the variable optical attenuator 25-1.

While the optical output of the optical tunable filter 22-1 is being substantially cut off, the controller 19 then sets a voltage to be applied to the optical tunable filter 22-1 to a target voltage by using the control signal B. After the voltage applied to the optical tunable filter 22-1 becomes steady, the controller 19 then gradually gets the attenuation level of the variable optical attenuator 25-1 back to the minimum value.

Before the voltage applied to an optical tunable filter of the constitution described above becomes steady, the optical output of the optical tunable filter is substantially cut off. Thus, the optical tunable filter being adjusted does never output an unnecessary optical signal.

Incidentally, although FIG. 13 illustrates the variable optical attenuators 25-1 through 25-8 being provided on the output sides of the optical tunable filters 22-1 through 22-8, the variable optical attenuators 25-1 through 25-8 may be provided on the input sides of the optical tunable filters 22-1 through 22-8. In order that the optical input to the optical tunable filter for which the pass wavelength is adjusted is substantially cut off in this case, the controller 19 controls the variable optical attenuator corresponding to the optical tunable filter.

Figure 14:
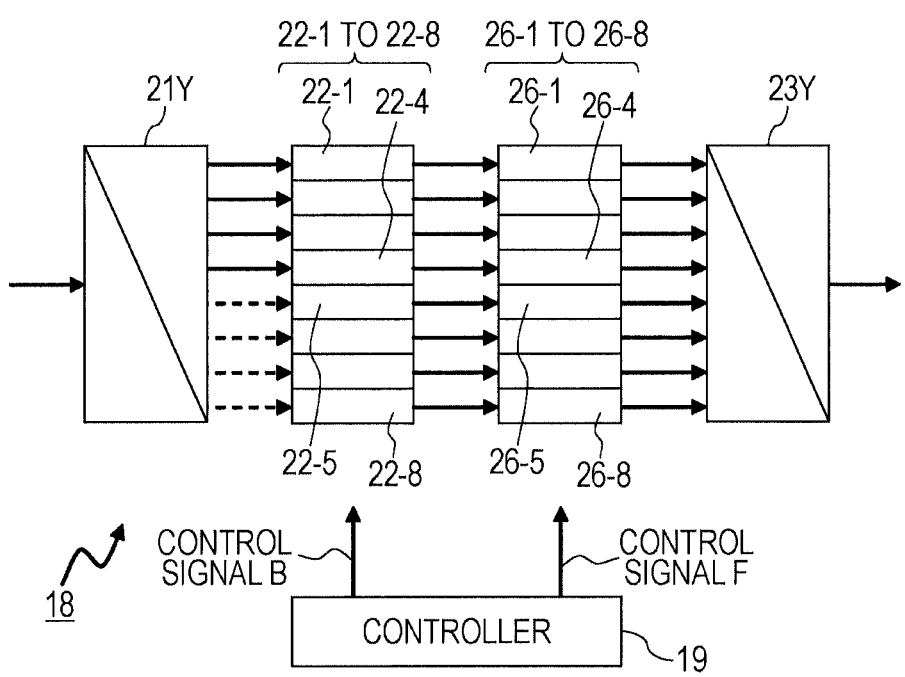
FIG. 14 illustrates a fifth exemplary optical filter circuit having a signal cut off function.

FIG. 14 illustrates still another example of the optical filter circuit 18 having a signal cut-off function. The optical filter circuit 18 illustrated in FIG. 14 has a blue/red bandpass filter 21Y, optical tunable filters 22-1 through 22-8, optical switches 26-1 through 26-8 and a blue/red bandpass filter 23Y. Incidentally, the blue/red bandpass filter 21Y is an example of the splitting circuit 21, and the blue/red bandpass filter 23Y is an example of the coupling circuit 23.

Figure 15:
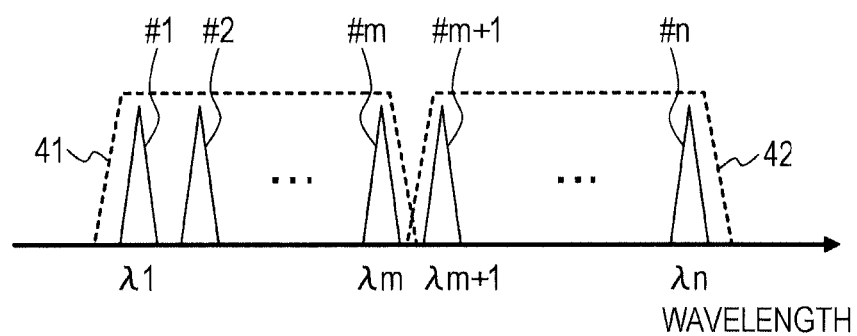
FIG. 15 illustrates an operation of a blue/red bandpass filter.

The blue/red bandpass filter 21Y has a blue bandpass filter which extracts a blue band 41 and a red bandpass filter which extracts a red band 42 as illustrated in FIG. 15. The blue bandpass filter extracts a short wavelength bandwidth $\lambda 1$-$\lambda m$ from the signal bandwidth $\lambda 1$-$\lambda n$ of the input WDM signal. That is, the blue bandpass filter extracts the optical signals #1-#m from the input WDM signal. Similarly, the red bandpass filter extracts a long wavelength bandwidth $\lambda m+1$-$\lambda n$ from the signal bandwidth $\lambda 1$-$\lambda n$. That is, the red bandpass filter extracts the optical signals #m+1-#n from the input WDM signal. Then, the blue/red bandpass filter 21Y transfers an optical signal in the blue band 41 to the optical tunable filters 22-1 through 22-4, and transfers an optical signal in the red band 42 to the optical tunable filters 22-5 through 22-8.

The optical tunable filters 22-1 through 22-8 each select a wavelength specified by the controller 19. Notice that the controller 19 specifies a pass wavelength in the wavelength ranges $\lambda 1$-$\lambda m$ and in the wavelength ranges $\lambda m+1$-$\lambda n$ for the optical tunable filters 22-1 through 22-4 and for the optical tunable filters 22-5 through 22-8, respectively.

The optical switches 26-1 through 26-8 each cuts off an optical signal as instructed by the controller 19 (by means of a control signal F in FIG. 14). If the optical filter circuit 18 regularly works (i.e., does not adjust the pass wavelengths of the optical tunable filters 22-1 through 22-8), the controller 19 controls conditions of the optical switches 26-1 through 26-8 so as to pass optical signals.

While a pass wavelength of a certain optical tunable filter is being adjusted, the controller 19 controls a state of a corresponding optical switch by using the control signal F in such a way as to cut off the optical output of the optical tunable filter. If, e.g., the pass wavelength of the optical tunable filter 22-1 is adjusted, the controller 19 controls the state of the optical switch 26-1 in such a way as to cut off the optical output of the optical tunable filter 22-1. Then, the optical output of the optical tunable filter 22-1 is cut off by the optical switch 26-1.

While the optical output of the optical tunable filter 22-1 is being cut off, the controller 19 then sets a voltage to be applied to the optical tunable filter 22-1 to a target voltage by using the control signal B. After the voltage applied to the optical tunable filter 22-1 becomes steady, the controller 19 then closes the optical switch 26-1 having been opened.

The blue/red bandpass filter 23Y works as the coupling circuit 23. That is, the blue/red bandpass filter 23Y combines optical signals in the blue band 41 outputted by the optical tunable filters 22-1 through 22-4 and optical signals in the red band 42 outputted by the optical tunable filters 22-5 through 22-8.

Until a voltage applied to an optical tunable filter in the constitution illustrated in FIG. 14 becomes steady, the optical output of the optical tunable filter is cut off. Thus, the optical tunable filter being adjusted does never output an unnecessary optical signal. If the optical splitters 21a-21g illustrated in FIG. 2 are replaced with the blue/red bandpass filter 21Y, the amount of optical loss decreases. Similarly, if the optical couplers 23a-23g illustrated in FIG. 2 are replaced with the blue/red bandpass filter 23Y, the amount of optical loss decreases.

Incidentally, although FIG. 14 illustrates the optical switches 26-1 through 26-8 being provided on the output sides of the optical tunable filters 22-1 through 22-8, the optical switches 26-1 through 26-8 may be provided on the input sides of the optical tunable filters 22-1 through 22-8. In order that the optical input to the optical tunable filter for which the pass wavelength is adjusted is cut off in this case, the controller 19 controls the state of the optical switch corresponding to the optical tunable filter.

Further, the constitutions illustrated in FIGS. 8A-8C and 10-14 may be combined in any way as long as they cause no contradiction. The optical filter circuit 18 illustrated in one of FIGS. 10-14, e.g., may have the optical tunable filter array 22X instead of the optical tunable filters 22-1 through 22-8. Meanwhile, the optical filter circuit 18 illustrated in FIG. 13 may have the optical switches 26-1 through 26-8 instead of the variable optical attenuators 25-1 through 25-8. Multi-bit rate WDM A WDM signal may carry a plurality of optical signals of different bit rates. A WDM signal illustrated in FIG. 16, e.g., includes optical signals #1 and #2 which carry data in 10 Gbit/s, optical signals #3 and #5 which carry data in 40 Gbit/s and optical signals #4 and #6 which carry data in 100 Gbit/s. A spectrum width of an optical signal, however, depends upon a bit rate of data to be carried. That is, optical signals of low and high bit rates have narrow and broad spectrum widths, respectively.

It is preferable that a pass bandwidth of an optical tunable filter which extracts an optical signal of a preferred wavelength from a WDM signal is determined in accordance with a spectrum width of the optical signal. If, e.g., the pass bandwidth of the optical tunable filter is too broad for the spectrum width of the target optical signal, not only signal components but noise components may be outputted and possibly cause a degraded optical SNR (Signal-to-Noise Ratio). Further, if the pass bandwidth of the optical tunable filter is too narrow for the spectrum width of the target optical signal, part of the signal components may be eliminated and possibly cause a degraded optical SNR in this case, too. A WDM system which transfers optical signals of various bit rates may be called a multi-bit rate WDM system, hereafter.

Figure 16:
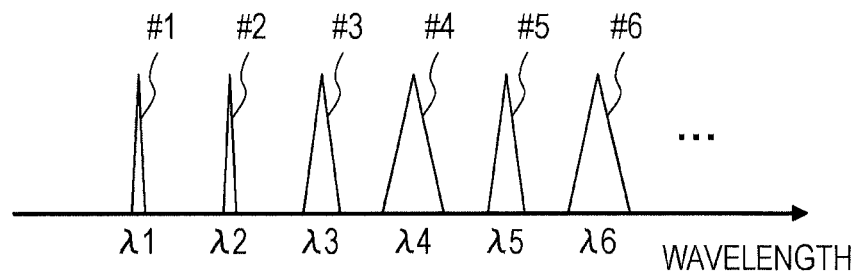
FIG. 16 illustrates an exemplary multi-bit rate WDM signal.
Figure 17A:
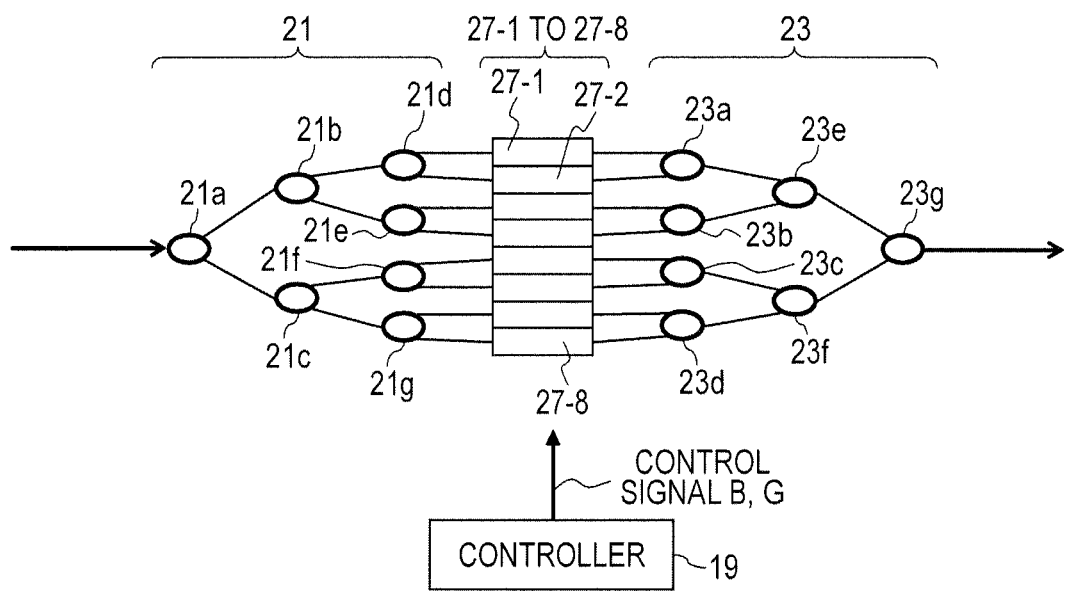
FIGS. 17A and 17B illustrates an exemplary optical filter circuit to be used in a multi-bit rate WDM system.

FIG. 17A illustrates an example of an optical filter circuit 18 to be used in a multi-bit rate WDM system. The optical filter circuit 18 illustrated in FIG. 17A has a splitting circuit 21 (optical splitters 21a-21g), bandwidth-variable optical tunable filters 27-1 through 27-8, and a coupling circuit 23 (optical couplers 23-1 through 23-8). Incidentally, suppose as explained below that the input WDM signal includes an optical signal which carries data in 10 Gbit/s, an optical signal which carries data in 40 Gbit/s and an optical signal which carries data in 100 Gbit/s as illustrated in FIG. 16.

The splitting circuit 21 and the coupling circuit 23 are each constituted and work as explained with reference to FIG. 2 or 4. Thus, the splitting circuit 21 splits the input WDM signal and transfers the split signals to the bandwidth-variable optical tunable filters 27-1 through 27-8. Further, the coupling circuit 23 combines the optical signals outputted from the bandwidth-variable optical tunable filters 27-1 through 27-8.

Figure 17B:
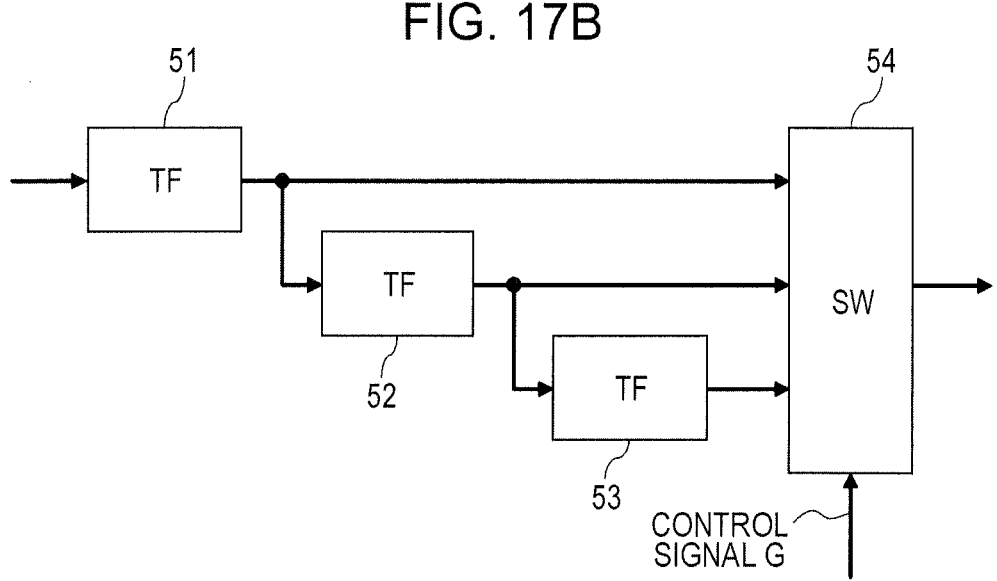

The bandwidth-variable optical tunable filters 27-1 through 27-8 each have optical tunable filters 51-53 and an optical switch 54 as illustrated in FIG. 17B. The optical tunable filter 51 transfers an optical output to the optical tunable filters 52 and the optical switch 54. The optical tunable filter 52 transfers an optical output to the optical tunable filter 53 and the optical switch 54. The optical tunable filter 53 transfers an optical output to the optical switch 54. The optical tunable filters 51-53 mentioned here each adjusts a pass wavelength as controlled by the controller 19. Notice that the controller 19 sets one and the same pass wavelength to the optical tunable filters 51-53 in one bandwidth-variable optical tunable filter.

The optical tunable filters 51-53 are each a bandpass optical filter. The pass bands of the optical tunable filters 51-53 mentioned here are adjusted in accordance with the control signal B produced by the controller 19 as described above. Further, the pass bandwidths of the optical tunable filters 51-53 are as follows. That is, the pass bandwidth of the optical tunable filter 51 is optimized for extraction of an optical signal which carries data in 100 Gbit/s. Similarly, the pass bandwidths of the optical tunable filters 52 and 53 are optimized for extraction of optical signals which carry data in 40 Gbit/s and 10 Gbit/s, respectively. In this case, the optical tunable filters 51 and 53 have the broadest and narrowest pass bandwidths, respectively, in the three filters 51-53.

The optical switch 54 selects one of the optical tunable filters 51-53 as instructed by the controller 19 (by means of a control signal G in FIG. 17). At this time, the controller 19 selects one of the optical tunable filters 51-53 in accordance with the bit rate of the optical signal to be selected. If the bit rate of the optical signal is 100 Gbit/s, e.g., the controller 19 produces a control signal G to make the optical switch 54 select the optical output signal of the optical tunable filter 51. If the bit rate of the optical signal is 40 Gbit/s, the controller 19 produces the control signal G to make the optical switch 54 select the optical output signal of the optical tunable filter 52. Similarly, if the bit rate of the optical signal is 10 Gbit/s, the controller 19 produces the control signal G to make the optical switch 54 select the optical output signal of the optical tunable filter 53. Incidentally, suppose that the controller 19 is aware of the bit rates of the respective optical signals included in the WDM signal.

The optical filter circuit 18 illustrated in FIG. 17 has a bandwidth-variable optical tunable filter as described above, and adjusts the pass wavelength of the bandwidth-variable optical tunable filter in any way. A preferred wavelength thereby is selected from the WDM signal by means of the constitution illustrated in FIG. 17, and the optical SNR of the selected optical signal is raised.

Incidentally, the bandwidth-variable optical tunable filter is not limited to the constitution illustrated in FIG. 17B. The input WDM signal may be split into the optical tunable filters 51-53, e.g., by the use of optical splitters. In this case, the optical outputs of the optical tunable filters 51-53 are each transferred to the optical switch 54.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission device comprising:
a wavelength selective switch configured to select a first optical signal having a first wavelength from an input wavelength division multiplexing (WDM) signal on a predetermined wavelength grid of the input WDM signal;
an optical filter circuit configured to include:
a plurality of optical tunable filters, each having a pass wavelength that is tunable to a second wavelength of a second optical signal which is not on the predetermined wavelength grid, for passing therethrough;
a controller to control the pass wavelength of each of the plurality of optical tunable filters,
a splitter circuit to split the wavelength division multiplexing signal, a split signal split by the splitter circuit being transferred to each of the plurality of optical tunable filters, and
a coupler circuit to couple a plurality of optical signals transferred from the plurality of optical tunable filters;
a splitter configured to split the input WDM signal, a split signal split by the splitter being transferred to the optical filter circuit; and
a coupler configured to couple the first optical signal selected by the wavelength selective switch and the second optical signal passed through the optical filter circuit,
wherein the controller is configured to control the optical filter circuit so that while the pass wavelength of a first optical tunable filter included in the plurality of optical tunable filters is tuned in a period of time for tuning adjustment, transferring of an optical output of the first optical tunable filter is prevented, or power of an optical output of the first optical tunable filter is reduced.

2. The optical transmission device according to claim 1, further comprising:
a first demultiplexer configured to demultiplex on a wavelength-by-wavelength basis, an optical signal having the first wavelength included in the input signal;
a second demultiplexer configured to demultiplex on a wavelength-by-wavelength basis, an optical signal having the second wavelength included in the input signal;
a first multiplexer configured to multiplex optical signals having the first wavelength; and
a second multiplexer configured to multiplex optical signals having the second wavelength, wherein:
the split signal split by the splitter is transferred to each of the optical filter circuit, the first demultiplexer and the second demultiplexer; and
optical signals transferred from each of the first multiplexer and the second multiplexer are coupled with the first optical signal selected by the wavelength selective switch.

3. The optical transmission device according to claim 1, wherein the plurality of optical tunable filters is configured to form an optical tunable filter array.

4. The optical transmission device according to claim 1, wherein the splitter circuit is configured to be formed by a plurality of optical splitters connected in a multistage form.

5. The optical transmission device according to claim 1, wherein the splitter circuit is configured to have a single input port and a plurality of output ports.

6. The optical transmission device according to claim 1, wherein the coupler circuit is configured to be formed by a plurality of optical couplers connected in a multistage form.

7. The optical transmission device according to claim 1, wherein the coupler circuit is configured to have a plurality of input ports and a single output port.

8. The optical transmission device according to claim 1, wherein:
the splitter circuit is configured to include a variable optical splitter having an adjustable splitting ratio and splitting the wavelength division multiplexing signal to a first split signal transferred to the first optical tunable filter and a second split signal transferred to a second optical tunable filter included in the plurality of optical tunable filters on the basis of the splitting ratio; and
the controller is configured to control the splitting ratio in the period of time for tuning adjustment so as to reduce power of the first split signal.

9. The optical transmission device according to claim 8, further comprising:
a variable optical attenuator arranged on one of an input side and an output side of each of the plurality of optical tunable filters,
wherein the controller is configured to control the variable optical attenuator corresponding to the second optical tunable filter in the period of time for tuning adjustment so as to compensate for a change of power of an optical signal outputted by the second optical tunable filter in the period of time for tuning adjustment.

10. The optical transmission device according to claim 1, wherein:
the coupler circuit is configured to include a variable optical coupler having an adjustable coupling ratio, and coupling an optical signal outputted from the first optical tunable filter and an optical signal outputted from a second optical tunable filter included in the plurality of optical tunable filters on the basis of the adjustable coupling ratio; and
the controller is configured to control the coupling ratio in the period of time for tuning adjustment so as to reduce power of the optical signal outputted from the first optical tunable filter.

11. The optical transmission device according to claim 1, further comprising:
a plurality of variable optical attenuators each corresponding to each of the plurality of optical tunable filters,
wherein the controller is configured to control the variable optical attenuator corresponding to the first optical tunable filter in the period of time for adjustment so as to reduce power of an optical signal outputted from the first optical tunable filter.

12. The optical transmission device according to claim 1, further comprising:
a plurality of optical switches each corresponding to each of the plurality of optical tunable filters,
wherein the controller is configured to control an optical switch, corresponding to the first optical tunable filter, included in the plurality of optical switches in the period of time for tuning adjustment so as to cut off an optical signal outputted from the first optical tunable filter.

13. The optical transmission device according to claim 1, further comprising:
a plurality of variable optical attenuators each corresponding to each of the plurality of optical tunable filters,
wherein the controller is configured to control a variable optical attenuator, corresponding to the first optical tunable filter, included in the plurality of variable optical attenuators in the period of time for tuning adjustment so as to reduce power of an optical signal inputted to the first optical tunable filter.

14. The optical transmission device according to claim 1, further comprising:
a plurality of optical switches each corresponding to each of the plurality of optical tunable filters,
wherein the controller is configured to control an optical switch, corresponding to the first optical tunable filter, included in the plurality of optical switches in the period of time for tuning adjustment so as to cut off an optical signal inputted to the first optical tunable filter.

15. The optical transmission device according to claim 1, wherein the splitter circuit is configured to operate as a bandpass filter that extracts a plurality of optical signals in a first band included in a band of the wavelength division multiplexing signal, the extracted plurality of optical signals being transferred to a plurality of corresponding optical tunable filters belonging to a first group included in the plurality of optical tunable filters, and extracts a plurality of optical signals in a second band included in the band of the wavelength division multiplexing signal, the second band being different from the first band, the extracted plurality of optical signals being transferred to a plurality of corresponding optical tunable filters belonging to a second group included in the plurality of optical tunable filters.

16. The optical transmission device according to claim 15, wherein the coupler circuit is configured to operate as a bandpass filter that wavelength-division multiplexes an optical signal in the first band outputted by an optical tunable filter belonging to the first group and an optical signal in the second band outputted by an optical tunable filter belonging to the second group.

17. An optical transmission device comprising:
a wavelength selective switch configured to select a first optical signal having a first wavelength from an input wavelength division multiplexing (WDM) signal on a predetermined wavelength grid of the input WDM signal;
an optical filter circuit configured to include
 a plurality of optical tunable filters each being configured to have a pass wavelength that is tunable to a wavelength of an optical signal inputted therein and to have a pass bandwidth that is adjustable;
 a controller configured to control the pass wavelength and the pass bandwidth of each of the plurality of optical tunable filters;
 a splitter circuit configured to split the wavelength division multiplexing signal, a split signal split by the splitter circuit being transferred to each of the plurality of optical tunable filters; and
 a coupler circuit configured to couple a plurality of optical signals transferred from the plural optical tunable filters,
a splitter configured to split the input WDM signal, a split signal split by the splitter being transferred to the optical filter circuit; and
a coupler configured to couple the first optical signal selected by the wavelength selective switch and the second optical signal passed through the optical filter circuit,
wherein:
 the controller produces a first control signal based on a wavelength of an optical signal selected by an optical tunable filter to be controlled;
 the controller produces a second control signal based on a bit rate of the optical signal selected by the optical tunable filter to be controlled;
 the pass bandwidth of the optical tunable filter to be controlled is tuned to the pass wavelength in accordance with the first control signal; and
 the optical tunable filter to be controlled adjusts the pass bandwidth in accordance with the second control signal.

* * * * *

UNITED STATES PATENT AND TRADEMARK OFFICE
CERTIFICATE OF CORRECTION

PATENT NO.         : 8,977,130 B2
APPLICATION NO.    : 13/325780
DATED              : March 10, 2015
INVENTOR(S)        : Koji Takeguchi et al.

Page 1 of 1

It is certified that error appears in the above-identified patent and that said Letters Patent is hereby corrected as shown below:

In the Claims

Column 22, Line 5, In Claim 17, delete "filters" and insert -- filters, --, therefor.

Signed and Sealed this
Twenty-third Day of June, 2015

Michelle K. Lee
*Director of the United States Patent and Trademark Office*